United States Patent
Lee et al.

(10) Patent No.: US 10,867,136 B2
(45) Date of Patent: Dec. 15, 2020

(54) AUTOMATIC INTERPRETATION METHOD AND APPARATUS

(71) Applicant: SAMSUNG ELECTRONICS CO., LTD., Suwon-si (KR)

(72) Inventors: Hodong Lee, Yongin-si (KR); Youngki Park, Seoul (KR); Sang Hyun Yoo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/404,941

(22) Filed: Jan. 12, 2017

(65) Prior Publication Data
US 2018/0011843 A1  Jan. 11, 2018

(30) Foreign Application Priority Data
Jul. 7, 2016  (KR) .................. 10-2016-0086036

(51) Int. Cl.
G06F 40/51  (2020.01)
G06F 40/30  (2020.01)
(Continued)

(52) U.S. Cl.
CPC .............. G06F 40/51 (2020.01); G06F 40/30 (2020.01); G06F 40/44 (2020.01); G06F 40/56 (2020.01);
(Continued)

(58) Field of Classification Search
CPC ......... G10L 15/20; G10L 25/30; G10L 13/00; G10L 15/02; G10L 15/26;
(Continued)

(56) References Cited

U.S. PATENT DOCUMENTS 5,809,461 A   9/1998  Inazumi
7,224,981 B2  5/2007  Deisher et al.
(Continued)

FOREIGN PATENT DOCUMENTS

GB   2 220 285 A   1/1990
GB   2518318 A     3/2015
(Continued)

OTHER PUBLICATIONS

Alkhouli, Tamer, et al. "Vector Space Models for Phrase-Based Machine Translation." *Syntax, Semantics and Structure in Statistical Translation* (2014): 1-10. (10 pages, in English).
(Continued)

*Primary Examiner* — Fariba Sirjani
(74) *Attorney, Agent, or Firm* — NSIP Law

(57) ABSTRACT

Provided is an automated interpretation method, apparatus, and system. The automated interpretation method includes encoding a voice signal in a first language to generate a first feature vector, decoding the first feature vector to generate a first language sentence in the first language, encoding the first language sentence to generate a second feature vector with respect to a second language, decoding the second feature vector to generate a second language sentence in the second language, controlling a generating of a candidate sentence list based on any one or any combination of the first feature vector, the first language sentence, the second feature vector, and the second language sentence, and selecting, from the candidate sentence list, a final second language sentence as a translation of the voice signal.

51 Claims, 20 Drawing Sheets

(51) Int. Cl.
*G06F 40/44* (2020.01)
*G06F 40/56* (2020.01)
*G06F 40/58* (2020.01)
*G10L 15/02* (2006.01)
*G10L 25/30* (2013.01)
*G10L 15/26* (2006.01)
*G10L 13/00* (2006.01)

(52) U.S. Cl.
CPC .............. *G06F 40/58* (2020.01); *G10L 15/02* (2013.01); *G10L 25/30* (2013.01); *G10L 13/00* (2013.01); *G10L 15/26* (2013.01)

(58) Field of Classification Search
CPC ......... G10L 704/01–10; G06F 17/2854; G06F 17/2785; G06F 17/2818; G06F 17/2881; G06F 17/289
See application file for complete search history.

(56) References Cited

U.S. PATENT DOCUMENTS

| | | | |
|---|---|---|---|
| 7,697,760 B2 | 4/2010 | Kwok et al. | |
| 7,769,580 B2 | 8/2010 | Gemello et al. | |
| 7,904,294 B1 | 3/2011 | Rose et al. | |
| 8,078,469 B2 | 12/2011 | White et al. | |
| 8,296,123 B2 | 10/2012 | Thayer et al. | |
| 8,352,243 B2 | 1/2013 | Jang et al. | |
| 8,775,177 B1* | 7/2014 | Heigold | G10L 15/10 379/88.22 |
| 8,775,181 B2 | 7/2014 | Ehsani et al. | |
| 8,930,194 B2 | 1/2015 | Newman et al. | |
| 9,704,257 B1* | 7/2017 | Tuzel | G06N 3/04 |
| 2001/0029449 A1* | 10/2001 | Tsurufuji | G10L 15/20 704/226 |
| 2004/0148170 A1* | 7/2004 | Acero | G06F 40/216 704/257 |
| 2005/0060160 A1* | 3/2005 | Roh | G06F 40/58 704/277 |
| 2006/0173684 A1* | 8/2006 | Fischer | G10L 15/20 704/254 |
| 2006/0271370 A1 | 11/2006 | Li | |
| 2007/0203688 A1* | 8/2007 | Fuji | G06F 17/28 704/2 |
| 2008/0027705 A1 | 1/2008 | Koga | |
| 2008/0077391 A1* | 3/2008 | Chino | G10L 15/26 704/7 |
| 2008/0086300 A1* | 4/2008 | Anismovich | G06F 40/56 704/9 |
| 2008/0133245 A1* | 6/2008 | Proulx | G06F 17/2818 704/277 |
| 2008/0154577 A1 | 6/2008 | Kim et al. | |
| 2008/0288474 A1* | 11/2008 | Chin | G06F 17/30669 |
| 2009/0171662 A1* | 7/2009 | Huang | G10L 15/1822 704/251 |
| 2009/0182549 A1* | 7/2009 | Anisimovich | G06F 40/55 704/4 |
| 2010/0088096 A1 | 4/2010 | Parsons | |
| 2011/0046941 A1 | 2/2011 | Manuel-Devados | |
| 2011/0097693 A1 | 4/2011 | Crawford | |
| 2012/0078607 A1* | 3/2012 | Sumita | G06F 40/58 704/2 |
| 2012/0323554 A1 | 12/2012 | Hopkins et al. | |
| 2013/0103382 A1* | 4/2013 | Kim | G06F 17/2827 704/2 |
| 2013/0103695 A1* | 4/2013 | Rarrick | G06F 40/51 707/748 |
| 2013/0138589 A1 | 5/2013 | Yu et al. | |
| 2014/0229158 A1* | 8/2014 | Zweig | G06N 3/04 704/9 |
| 2014/0330551 A1* | 11/2014 | Bao | G06F 16/00 704/3 |
| 2015/0134336 A1* | 5/2015 | Huang | G06F 16/36 704/254 |
| 2015/0227505 A1* | 8/2015 | Morimoto | G06F 40/30 704/9 |
| 2016/0078020 A1* | 3/2016 | Sumita | G10L 15/26 704/9 |
| 2016/0117316 A1* | 4/2016 | Le | G10L 15/16 704/9 |
| 2016/0275667 A1* | 9/2016 | Modica | G06F 3/0346 |
| 2016/0350290 A1* | 12/2016 | Fujiwara | G06N 20/00 |
| 2017/0031901 A1* | 2/2017 | Song | G06F 40/58 |
| 2017/0228382 A1* | 8/2017 | Haviv | G06N 3/08 |

FOREIGN PATENT DOCUMENTS

| | | |
|---|---|---|
| JP | 4756499 B2 | 6/2011 |
| KR | 10-0853173 B1 | 8/2008 |
| KR | 10-1134467 B1 | 4/2012 |
| KR | 10-2015-0069188 A | 6/2015 |
| KR | 10-1543992 B1 | 8/2015 |

OTHER PUBLICATIONS

Cho, Kyunghyun, et al. "On the Properties of Neural Machine Translation: Encoder-Decoder Approaches." *arXiv preprint arXiv*:1409. 1259 103-111 (2014). (9 pages, in English).

Hatakoshi, Yuto, et al. "Rule-Based Syntactic Preprocessing for Syntax-Based Machine Translation." *Syntax, Semantics and Structure in Statistical Translation* (2014): 34-42. (9 pages, in English).

Singla, Karan, et al. "Reducing the Impact of Data Sparsity in Statistical Machine Translation." *Syntax, Semantics and Structure in Statistical Translation* 51-56 (2014). (6 pages, in English).

Extended European Search Report dated Aug. 31, 2017 in counterpart European Application No. 17155528.7 (10 pages).

\* cited by examiner

FIG. 5
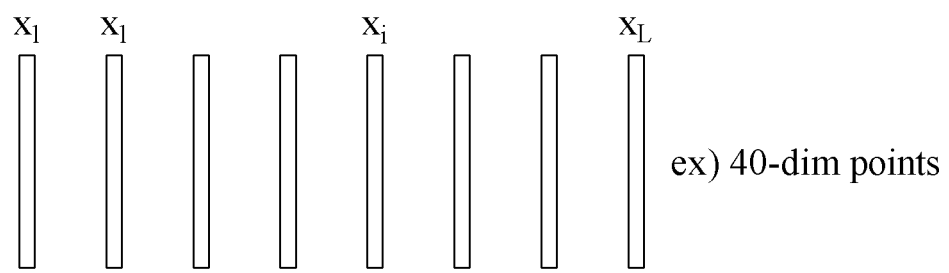
N-dimensional points (100 frames/sec)
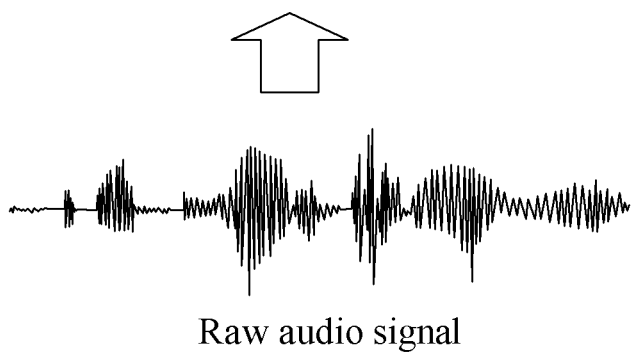
Raw audio signal

FIG. 8
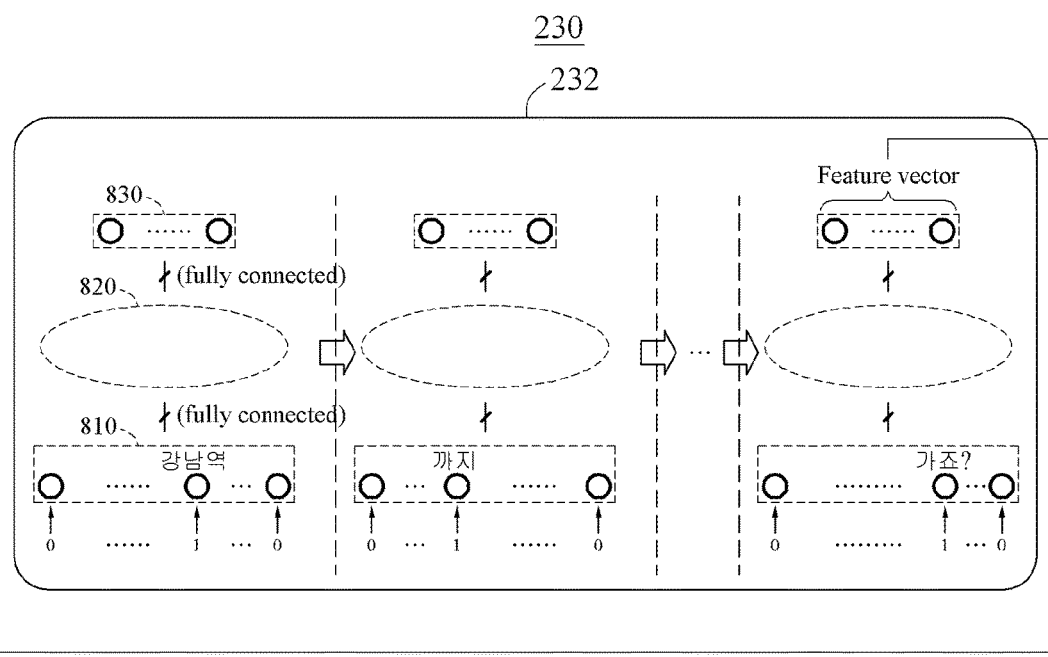
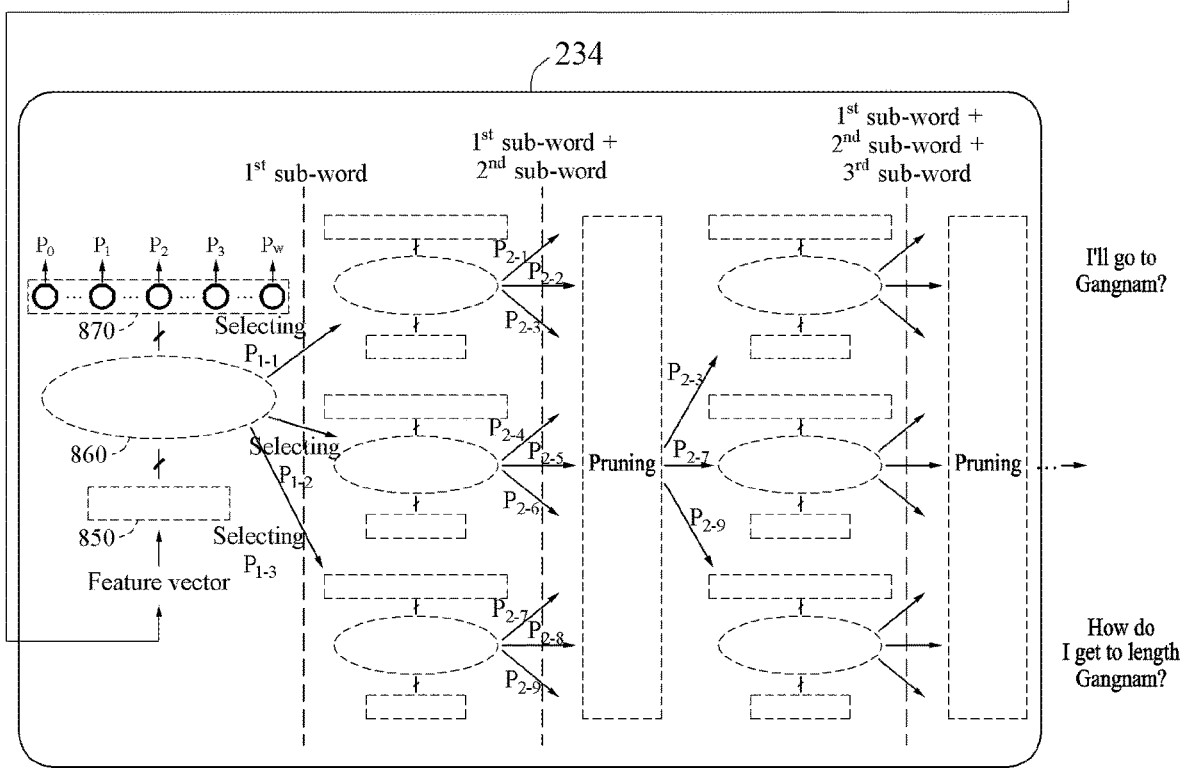

FIG. 9

| Abstracted voice information | Voice recognition result | Abstracted sentence information | Initial translation result | Final translation result |
|---|---|---|---|---|
| [1.00000478234, -3.1293187734, -1.2349232344, 0.9992382472] | 강남역까지 어떻게 가나요? | [1.00000478234, -3.1293187734, -1.2349232344, 0.9992382472] | How do I get to Gangnam? | How do I get to Gangnam station? |
| [4.00000478234, -2.1293187734, -3.2349232344, 4.9992382472] | 맛있는 짜장면 집 알려주세요. | [9.2937847233, -7.0298374273, -4.1923742746, 3.2342344444] | Tell us delicious jajangmyeon home. | Tell us delicious jajangmyeon home. |
| [2.00000478234, -3.1113187734, -2.2345232314, 1.1234352356] | 강남역까지 가는 길이 어떻게 되나요? | [2.00000478234, -4.1293187734, -1.2345682745, 0.8347474592] | How do I get to length Gangnam? | How do I get to Gangnam station? |
| [1.0400023742, -3.2193423332, -1.2474720392, 0.9999999988] | 강남역으로 어떻게 가죠? | [1.50005782344, -4.1293187222, -1.2343453453, 1.1238234872] | I'll go to Gangnam? | How do I get to Gangnam station? |

FIG. 10
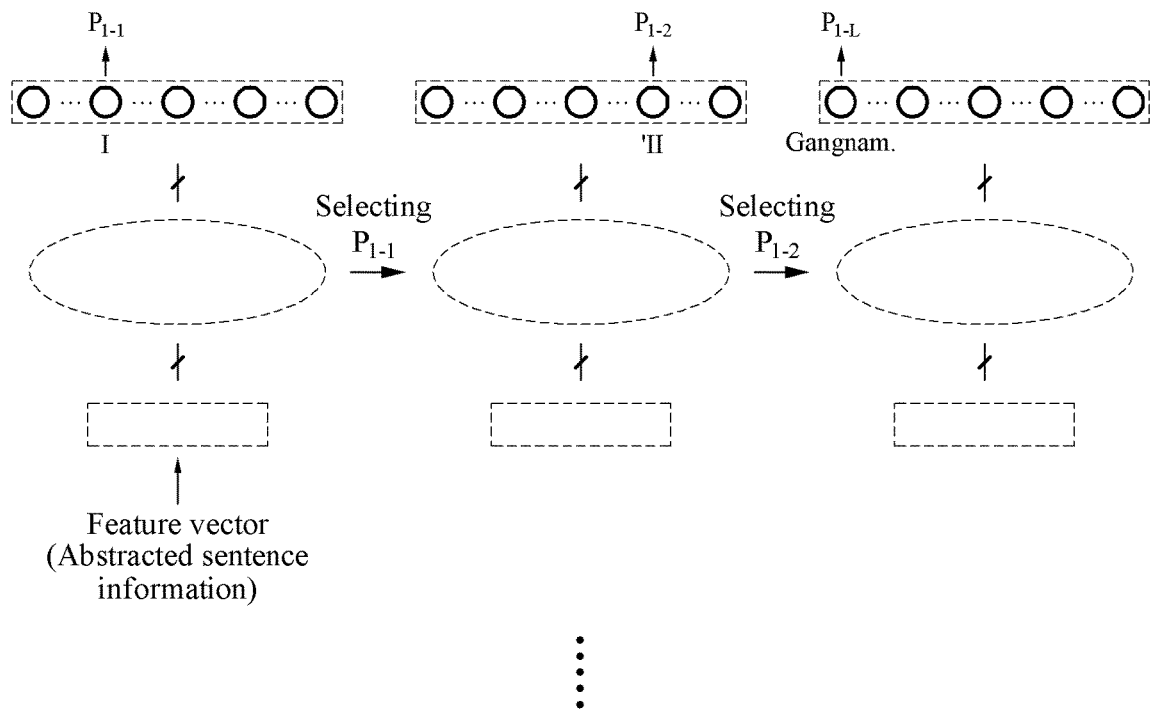
<First candidate sentence rescoring>
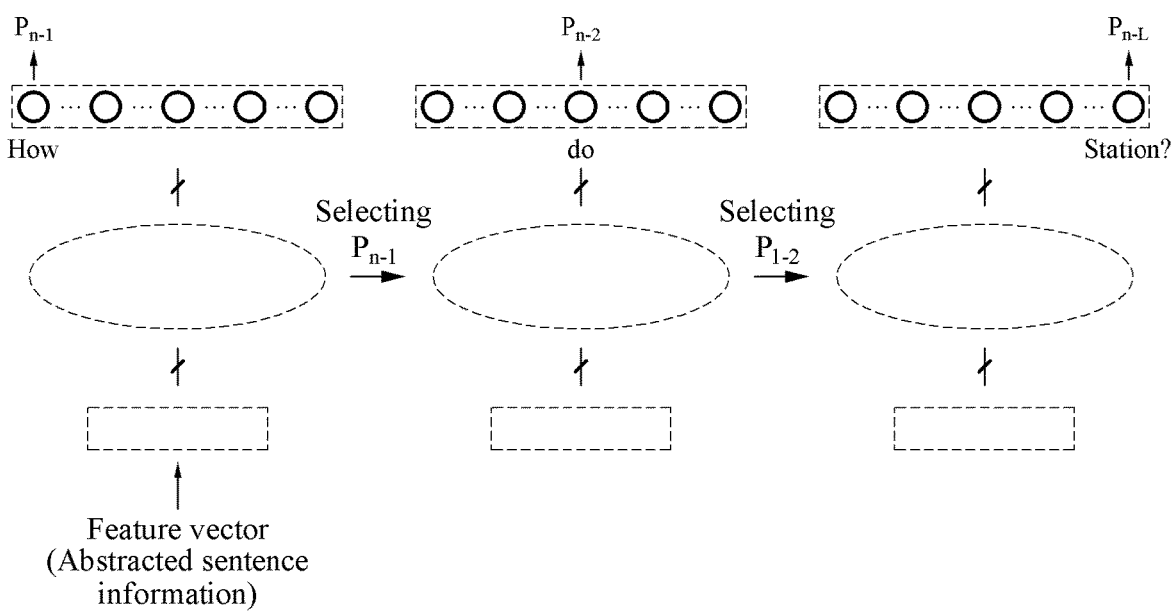
<n<sup>th</sup> candidate sentence rescoring>

AUTOMATIC INTERPRETATION METHOD AND APPARATUS

CROSS-REFERENCE TO RELATED APPLICATION

This application claims the benefit under 35 USC 119(a) of Korean Patent Application No. 10-2016-0086036 filed on Jul. 7, 2016, in the Korean Intellectual Property Office, the entire disclosure of which is incorporated herein by reference for all purposes.

BACKGROUND

1. Field

The following description relates to an automated interpretation method and apparatus.

2. Description of Related Art

Developments of the Internet and information telecommunication (IT) technology have enabled people to receive contents in various languages. Also, with globalization in business, recognition and translation technologies for content translation and communication among users using various languages have been of interest.

Due to differences in the words that are used or the expression types of sentences, different recognitions and translations may be derived from voice inputs having similar or same meanings.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, an automated interpretation method includes encoding a voice signal in a first language to generate a first feature vector, decoding the first feature vector to generate a first language sentence in the first language, encoding the first language sentence to generate a second feature vector with respect to a second language, decoding the second feature vector to generate a second language sentence in the second language, controlling a generating of a candidate sentence list based on any one or any combination of the first feature vector, the first language sentence, the second feature vector, and the second language sentence, and selecting, from the candidate sentence list, a final second language sentence as a translation of the voice signal.

The generating of the candidate sentence list may include acquiring a candidate sentence, from a database, determined to correspond to any one or any combination of the first feature vector, the first language sentence, the second feature vector, and the second language sentence from a database.

The acquiring of the candidate sentence may include retrieving respective elements determined similar to any of the first feature vector, the first language sentence, the second feature vector, and the second language sentence from a plurality of elements stored in the database based on one or more approximate nearest neighbor (NN) algorithms.

The generating of the candidate sentence list may include any one or any combination of acquiring a first interpretation result matching a first language feature vector, from a database, determined similar to the first feature vector, acquiring a second interpretation result matching a previous recognized sentence, from the database, determined similar to the first language sentence, acquiring a third interpretation result matching a second language feature vector, from the database, determined similar to the second feature vector, and acquiring a fourth interpretation result matching a previous translation sentence, from the database, determined similar to the second language sentence.

The generating of the candidate sentence list may further include adding any previous translation sentences corresponding to any of the first interpretation result, the second interpretation result, the third interpretation result, and the fourth interpretation result to the candidate sentence list, and adding the second language sentence to the candidate sentence list.

The acquiring of the second interpretation result may include converting the first language sentence into a vector, and determining which of plural previous recognized sentences, from the database, are similar to the first language sentence based on the vector.

The acquiring of the fourth interpretation result may include converting the second language sentence into a vector, and determining which of plural previous translation sentences, from the database, are similar to the second language sentence based on the vector.

The selecting of the final second language sentence may include calculating scores of candidate sentences included in the candidate sentence list based on the second feature vector, and selecting a candidate sentence, from the candidate sentence list, having a highest of the calculated scores to be the final second language sentence.

The generating of the first feature vector may include sampling the voice signal in the first language based on a predetermined frame length, generating respective input vectors corresponding to frames, sequentially inputting the respective input vectors to an encoder used for voice recognition, and determining the first feature vector to be an output from the encoder for the sequentially input respective input vectors.

The generating of the first language sentence may include inputting the first feature vector to a decoder used for voice recognition, generating a predetermined number of sentence sequences based on probabilities of sub-words sequentially output from the decoder, and selecting a sentence sequence having a highest score among the predetermined number of sentence sequences to be the first language sentence.

The generating of the second feature vector may include dividing the first language sentence into a plurality of sub-words, sequentially inputting input vectors respectively indicating the plurality of sub-words to an encoder used for machine translation, and determining the second feature vector to be an output from the encoder for the sequentially input input vectors.

The generating of the second language sentence may include inputting the second feature vector to a decoder used for machine translation, generating a predetermined number of sentence sequences based on probabilities of sub-words sequentially output from the decoder, and selecting a sentence sequence having a highest score among the predetermined number of sentence sequences to be the second language sentence.

The method may further include storing the first feature vector, the first language sentence, and the second feature vector in a database, and storing any one or any combination of the second language sentence and the final second language sentence corresponding to the first feature vector, the first language sentence, and the second feature vector in the database.

In one general aspect, one or more embodiments may include a non-transitory computer-readable storage medium storing instructions that, when executed by a processor, cause the processor to perform any one or any combination of operations and processes discussed herein.

In one general aspect, an automated interpretation method includes encoding a first language sentence in a first language to generate a feature vector with respect to a second language, decoding the feature vector to generate a second language sentence in the second language, controlling a generating of a candidate sentence list based on any one or any combination of the feature vector and the second language sentence, and selecting, from the candidate sentence list, a final second language sentence from the candidate sentence list.

The method may further include encoding a voice signal in the first language to generate a first feature vector, and decoding the first feature vector to generate the first language sentence.

The generating of the candidate sentence list may include any one or any combination of acquiring a first translation result matching a second language feature vector, from a database, determined similar to the feature vector, and acquiring a second translation result matching a sentence, from the database, determined similar to the second language sentence.

The generating of the candidate sentence list may further include adding any previous translation sentences corresponding to any of the first translation result and the second translation result to the candidate sentence list, and adding the second language sentence to the candidate sentence list.

The selecting of the final second language sentence may include calculating scores of candidate sentences included in the candidate sentence list based on the feature vector, and selecting a candidate sentence, from the candidate sentence list, having a highest of the calculated scores to be the final second language sentence.

The generating of the feature vector may include dividing the first language sentence into a plurality of sub-words, sequentially inputting input vectors respectively indicating the plurality of sub-words to an encoder used for machine translation, and determining the feature vector to be an output from the encoder for the sequentially input input vectors.

The generating of the second language sentence may include inputting the feature vector to a decoder used for machine translation, generating a predetermined number of sentence sequences based on probabilities of sub-words sequentially output from the decoder, and selecting a sentence sequence having a highest score among the predetermined number of sentence sequences to be the second language sentence.

The method may further include storing the feature vector in a database, with the first language sentence being stored in the database, and storing any one or any combination of the second language sentence and the final second language sentence corresponding to the first language sentence and the feature vector in the database.

In one general aspect, an automated interpretation apparatus includes a voice recognizer configured to generate a first language sentence by decoding a first feature vector, and configured to generate the first feature vector with respect to a first language by recognition encoding a voice signal that is in the first language, a translator configured to generate a second language sentence in a second language by decoding a second feature vector, and configured to generate the second feature vector with respect to the second language by translation encoding the first language sentence that is in the first language, and a processor configured to select, as a translation of the voice signal, a final second language sentence from a candidate sentence list generated based on any one or any combination of the first feature vector, the first language sentence, the second feature vector, and the second language sentence.

The voice recognizer may include a recognition decoder configured to perform the decoding of the first feature vector to generate the first language sentence and a recognition encoder configured to perform the recognition encoding of the voice signal to generate the first feature vector, and the translator may include a translation decoder configured to perform the decoding of the second feature vector to generate the second language sentence and a translation encoder configured to perform the translation encoding of the first language sentence to generate the second feature vector.

The processor may be further configured to include the recognition encoder, the recognition decoder, the translation encoder, and the translation decoder, and the recognition encoder may implement a neural network, of one or more neural networks of the automated interpretation apparatus, configured to determine the first feature vector based on the voice signal, the recognition decoder may implement a neural network, of the one or more neural networks of the automated interpretation apparatus, configured to determine the first language sentence based on the first feature vector, the translation encoder may implement a neural network, of the one or more neural networks of the automated interpretation apparatus, configured to determine the second feature vector based on the first language sentence, and the translation decoder may implement a neural network, of the one or more neural networks of the automated interpretation apparatus, configured to determine the second language sentence based on the second feature vector.

The automated interpretation apparatus may further include a memory having a database, and the processor may be configured to acquire a candidate sentence determined to correspond to any one or any combination of the first feature vector, the first language sentence, the second feature vector, and the second language sentence from the database.

The processor may be configured to retrieve respective elements determined similar to any of the first feature vector, the first language sentence, the second feature vector, and the second language sentence from a plurality of elements stored in the database based on one or more approximate nearest neighbor (NN) algorithms.

The processor may be configured to acquire any one or any combination of a first interpretation result matching a first language feature vector, from a database, determined similar to the first feature vector, a second interpretation result matching a previous recognized sentence, from the database, determined similar to the first language sentence, a third interpretation result matching a second language feature vector, from the database, determined similar to the second feature vector, and a fourth interpretation result matching a previous translation sentence, from the database, determined similar to the second language sentence from a database.

The processor may be configured to add any previous translation sentences corresponding to any of the first interpretation result, the second interpretation result, the third interpretation result, and the fourth interpretation result to the candidate sentence list, and may be configured to add the second language sentence to the candidate sentence list.

The processor may be configured to convert the first language sentence into a vector and may be configured to determine which of plural previous recognized sentences, from the database, are similar to the first language sentence based on the vector.

The processor may be configured to convert the second language sentence into a vector and may be configured to determine which of plural previous translation sentences, from the database, are similar to the second language sentence based on the vector.

The translator may be configured to calculate scores of candidate sentences included in the candidate sentence list based on the second feature vector, and the processor may be configured to select a candidate sentence, from the candidate sentence list, having a highest of the calculated scores to be the final second language sentence.

The processor may be configured to sample the voice signal in the first language based on a predetermined frame length, configured to generate respective input vectors corresponding to frames, configured to sequentially input the respective input vectors to an encoder used for voice recognition, and configured to determine the first feature vector to be an output from the encoder for the sequentially input respective input vectors.

The processor may be configured to input the first feature vector to a decoder used for voice recognition, configured to generate a predetermined number of sentence sequences based on probabilities of sub-words sequentially output from the decoder, and configured to select a sentence sequence having a highest score among the predetermined number of sentence sequences to be the first language sentence.

The processor may be configured to divide the first language sentence into a plurality of sub-words, configured to sequentially input input vectors respectively indicating the plurality of sub-words to an encoder used for machine translation, and configured to determine the second feature vector to be an output from the encoder for the sequentially input input vectors.

The processor may be configured to input the second feature vector to a decoder used for machine translation, configured to generate a predetermined number of sentence sequences based on probabilities of sub-words sequentially output from the decoder, and configured to select a sentence sequence having a highest score among the predetermined number of sentence sequences to be the second language sentence.

The processor may be configured to store the first feature vector, the first language sentence, and the second feature vector in a database and may be configured to store any one or any combination of the second language sentence and the final second language sentence corresponding to the first feature vector, the first language sentence, and the second feature vector in the database.

In one general aspect, an automated interpretation system includes a translator configured to generate a second language sentence in a second language by decoding a feature vector and configured to generate the feature vector with respect to the second language by translation encoding a first language sentence that is in a first language, and a processor configured to select a final second language sentence, as a translation of the first language sentence, from a candidate sentence list generated based on any one or any combination of the feature vector and the second language sentence.

The automated interpretation system may further include a voice recognizer configured to generate the first language sentence by decoding a first feature vector generated by recognition encoding a voice signal in the first language.

The automated interpretation system may further include a memory having a database, and the processor may be configured to acquire any one or any combination of a first translation result matching a second language feature vector, from the database, determined similar to the feature vector and a second translation result matching a sentence, from the database, determined similar to the second language sentence.

The processor may be configured to add any previous translation sentences corresponding to any of the first translation result and the second translation result to the candidate sentence list, and may be configured to add the second language sentence to the candidate sentence list.

The translator may be configured to calculate scores of candidate sentences included in the candidate sentence list based on the feature vector, and the processor may be configured to select, from the candidate sentence list, a candidate sentence having a highest of the calculated scores to be the final second language sentence.

The processor may be configured to divide the first language sentence into a plurality of sub-words, configured to sequentially input input vectors respectively indicating the plurality of sub-words to an encoder used for machine translation, and configured to determine the feature vector to be an output from the encoder for the sequentially input input vectors.

The processor may be configured to input the feature vector to a decoder used for machine translation, configured to generate a predetermined number of sentence sequences based on probabilities of sub-words sequentially output from the decoder, and configured to select a sentence sequence having a highest score among the predetermined number of sentence sequences to be the second language sentence.

The processor may be configured to store the feature vector in a database, along with the first language sentence stored in the database, and may be configured to store any one or any combination of the second language sentence and the final second language sentence corresponding to the first language sentence and the feature vector in the database.

In one general aspect, an automated interpretation system includes one or more processors configured to perform voice recognition of an input voice signal, perform an initial translation of a recognition result of the voice recognition, and compare results of the initial translation and previous results of select previous translations to determine a final translation of the input voice signal, with the comparison including comparing information for one or more of information derived in the voice recognition and information derived in the initial translation with information stored in a database for one or more previous sentence translation results to identify the select previous translations from plural previous translations whose information is recorded in the database.

The comparison may include comparing information for one or more of a first feature vector derived in the voice recognition, a first language sentence derived in the voice recognition, a second feature vector derived in the initial translation, and a second language sentence derived in the initial translation with information stored in the database to identify the select previous translations.

The one or more processors may be included in a same mobile device.

Other features and aspects will be apparent from the following detailed description, the drawings, and the claims.

BRIEF DESCRIPTION OF THE DRAWINGS

FIG. 5 illustrates an example of a method of extracting features from a voice signal.

FIG. 8 illustrates an example operation and structure of a neural network configuring a translator according to one or more embodiments.

FIG. 9 illustrates an example of a type of information stored in a database according to one or more embodiments.

FIG. 10 illustrates an example of a method of selecting a final second language sentence.

Figure 1:
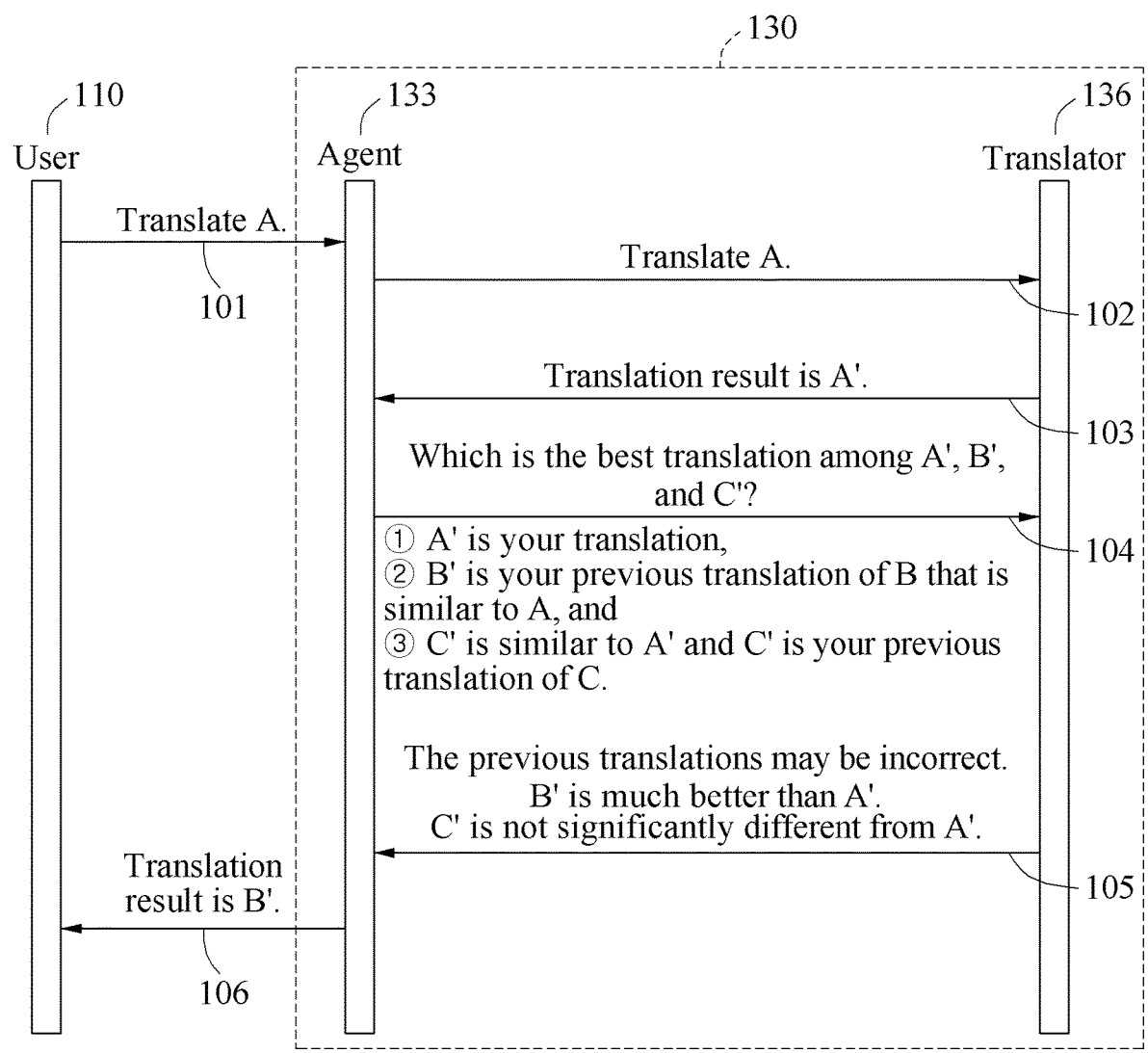
FIG. 1 illustrates an example operation of an automated interpretation apparatus according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The following example embodiments may be applicable to provide recognition and translation in/as an automobile, a television (TV), a mobile phone, and other electronic devices, depending on embodiment. Example embodiments may be implemented as various types of products such as a personal computer (PC), a laptop computer, a tablet computer, a smartphone, smart home appliances, a wearable device, and the like. In examples, embodiments include non-transitory computer readable media including interpretation application(s), instructions, or software to be executed in/by one or more processors of such a smartphone, mobile device, smart home system, wearable device, and the like embodiments. Example embodiments include a global conferencing hardware, or are configured to provide a translated transcription of audio and/or video conferences, or a corresponding method or non-transitory computer readable media causing one or more processors to be configured to implement the same. Also, example embodiments may include providing interpretations for communications between a driver and a passenger of a vehicle, such as public transportation automobiles, busses, trains, escalators, or people movers, as only examples, or other announcement or public auditory statements. Hereinafter, such non-limiting example embodiments will be described in more detail with reference to the accompanying drawings. Like reference numerals in the drawings denote like elements.

FIG. 1 illustrates an example of an operation principle of an automated interpretation apparatus. Referring to FIG. 1, an automated interpretation apparatus 130 performs automated interpretation of a first language spoken by a user 110 into a second language. The automated interpretation apparatus 130 includes an agent 133 and a translator 136. In an example, an automated interpretation apparatus may include a voice recognizer and/or a machine translator. The voice recognizer converts a voice of a user into a first language sentence. The machine translator converts the first language sentence into a second language sentence, where the first and second languages are different languages. In FIG. 1, it may be understood that the translator 136 corresponds to the machine translator and the agent 133 includes the voice recognizer and a controller configured to control a process of the automated interpretation. The controller may be alternatively otherwise configured in the automated interpretation apparatus, or external of the automated interpretation apparatus. The agent 133 may be an intelligent dialog agent, which may refer to computer or processing device hardware that perform recognition and understanding operations of audio information, such as in an intelligent dialog interaction between a user and the agent, or merely computer or processing device hardware that performs speech recognition. The agent 133 may control the output of the results of the recognition by the agent 133 and/or translation results of the translator 136, for example. The performed recognition may include various speech recognition methods of digitized speech, such as through use of either or a combination of an acoustic model, e.g., for phonetics or pronunciation, and a language model, e.g., for connectivity between words or phrases, as only examples. The digitized speech may be derived by an analog to digital converter (ADC) and parser of the agent 133, which may parse input speech into audio frames, which may then be provided to either or both of the example acoustic and/or language models, again noting that the references to such models is by way of example only and embodiments are not limited thereto. In addition to such models indicating a more or most likely recognition for an input audible speech, the models may also respectively indicate probabilities or scores for their respective potential phonetic or word recognitions. A decoder may be used to correlate the results of the recognition models, such as when either or both of the example acoustic and/or language models (and/or other models) are used, to determine a final recognition of audible speech, for example. In an example, the agent 133 and the translator 136 may each be implemented through non-transitory computer readable media including one or more instructions or software, through one or more hardware elements, or various combinations thereof.

The user 110 requests the automated interpretation apparatus 130 to interpret a voice signal A expressed by the first language using the second language. In this example, the voice signal A may be a voice signal of the first language. The user 110 may interact with a user interface of the automated interpretation apparatus 130 to request the recognition and/or translation, or the recondition and/or translation operations of the automated interpretation apparatus 130 may automatically or continuously operate, e.g., in a background operation of the underlying device, or the user 110 may selectively implement both/either the user interface request and the automatic implementations.

When the voice signal A is input to the automated interpretation apparatus 130 in operation 101, the agent 133 of the automated interpretation apparatus 130 recognizes the voice signal A and generates a sentence A of the first language. As noted above, the agent 133 may include hardware to convert the audible voice into a digital signal, for example the agent 133 may include one or microphones, ADCs, and parsers, or any or any combination of the microphone, ADCs, and parsers may be external of or included elsewhere in the automated interpretation apparatus 100. The agent 133 may recognize the voice signal A by providing the corresponding audio frames to one or more of the example recognition models of the agent 133, such as the acoustic and/or language models, and by decoding the results of the recognition model(s) as the sentence A of the first language. The sentence A may be finalized as text-type data, for example. As only examples, the recognition model(s) may be respective trained neuro networks. In operation 102, the automated interpretation apparatus 130 requests the translator 136 to translate the sentence A.

In operation 103, the translator 136 generates a sentence A' of the second language as an initial translation result of the sentence A and provides the results of the translation, e.g., sentence A', back to the agent 133. The agent 133 provides a sentence B' and a sentence C' of the second language, e.g., previously stored in a database, to the translator 136 such that the translator 136 selects an optimal translation result from the sentence A', the sentence B', and the sentence C' in operation 104. Here, agent 133 may determine that both sentences B' and C' are associated with respective speech similar to that of the voice signal A, e.g., from among other multiple sentences. The sentence B' and the sentence C' may be previously stored in the database as a result of previous interpreting operations by the automated interpretation apparatus 130, as only a non-limiting example. For example, when an interpretation request for a voice signal B was previously processed, the automated interpretation apparatus 130 may have generated the sentence B' and stored the generated sentence B' in the database. Also, the sentence C' may have been stored in the database in another previous process of interpreting a voice signal C. In an example, such sentences may be stored in one or more databases in a categorical or searchable manner, as only examples, so the agent 133 can associate previously stored sentences with information about a currently translated sentence and forward information of the same to the translator 136 for operation 104, for example.

In operation 105, the translator 136 selects an optimal translation result, among sentence A', sentence B', and sentence C' determined to have been acquired based on the determined similar speeches, to be the final translation result of the sentence A and transfers the final translation result back to the agent 133. For example, the translator 136 determines that the sentence B' is a better translation result for voice signal A in comparison to the initial translation result of sentence A'.

An optimal translation result for speech of a first language from candidate sentences of the second language may be more readily provided compared to a performance of only directly translating the content A of the first language into that of the second language. In addition, when the candidate sentences are determined to be candidates based on their determined relatedness to the speech in the first language and/or relatedness to an initial translation of the speech in the first language, with such relatedness determinations being based on various considerations, a final translation result for the speech of the first language may be more robust and accurate than mere singular or direct translations of the speech of the first language into the second language using the translation model implemented by the translator 136, e.g., the translation model that is implemented to derive the initial translation of the speech of the first language. Thus, in one or more embodiments, the translator 136 may collectively consider a current translation result and translation results accumulated in previous translation processes and selects one of the collectively considered translation results having a highest determined score to be a final translation result, thereby providing a more robust and accurate translation result for the speech in the first language.

In operation 106, the agent 133 transfers a final interpretation result to the user 110. The agent 133 may provide the final interpretation result to the user 110 in a form of text in the second language, such as through a display of the automated interpretation apparatus 130. In an example, the agent 133 may provide the final interpretation result to the user 110 audibly through a voice synthetization process of the agent 133 and a speaker of the automated interpretation apparatus 130. For example, the agent 133 may provide the final interpretation result to the user 110 in a form of voice in the second language based on text to speed (TTS) technology of the agent 133.

Depending on embodiment, the agent 133 and the translator 136 may each be implemented in or through a user terminal or in a server, such as a remote server. The agent 133 and the translator 136 may operate in the user terminal such as a smartphone, as only an example. The agent 133 and the translator 136 may also or alternatively operate in the server, such as by receiving either voice recordings of speech or audio frames from a remote terminal. The server implementation may also consider candidate sentences from different local and/or remote terminals when determining the best translation for input speech. Also, the agent 133 may operate in the user terminal and the translator 136 may operate in the server, e.g., with the user terminal forwarding recognition results to the translator 136 and the translator 136 returning results to the agent 133 in accordance with operations of FIG. 1. The foregoing are merely examples and thus, various changes are available thereto. For example, a controller included in the agent 133 may operate in the user terminal and a voice recognizer and a machine translator may operate in the server. In addition, while operations may be discussed as being performed by the agent 133 or operations may be discussed as being performed by the translator 136, the controller of the agent 133 may control such operations to be performed by each of the agent 133 and translator 136 and control receipt and transmission of information therebetween as discussed above in the operations of FIG. 1. Alternatively, the controller may be included in the translator 136, or both the agent 133 and the translator 136 may respectively include controllers that respectively control each of the agent 133 and translator 136 and transmit results of the above operations therebetween, as only examples.

In an example, a configuration and operation of an automated interpretation apparatus 130 configured to perform both recognition and translation will be described with reference to FIG. 2. In another example, a configuration and operation of an automated interpretation apparatus 130 configured to perform translation, without or without such recognition features, will be described with reference to FIG. 3.

Figure 2:
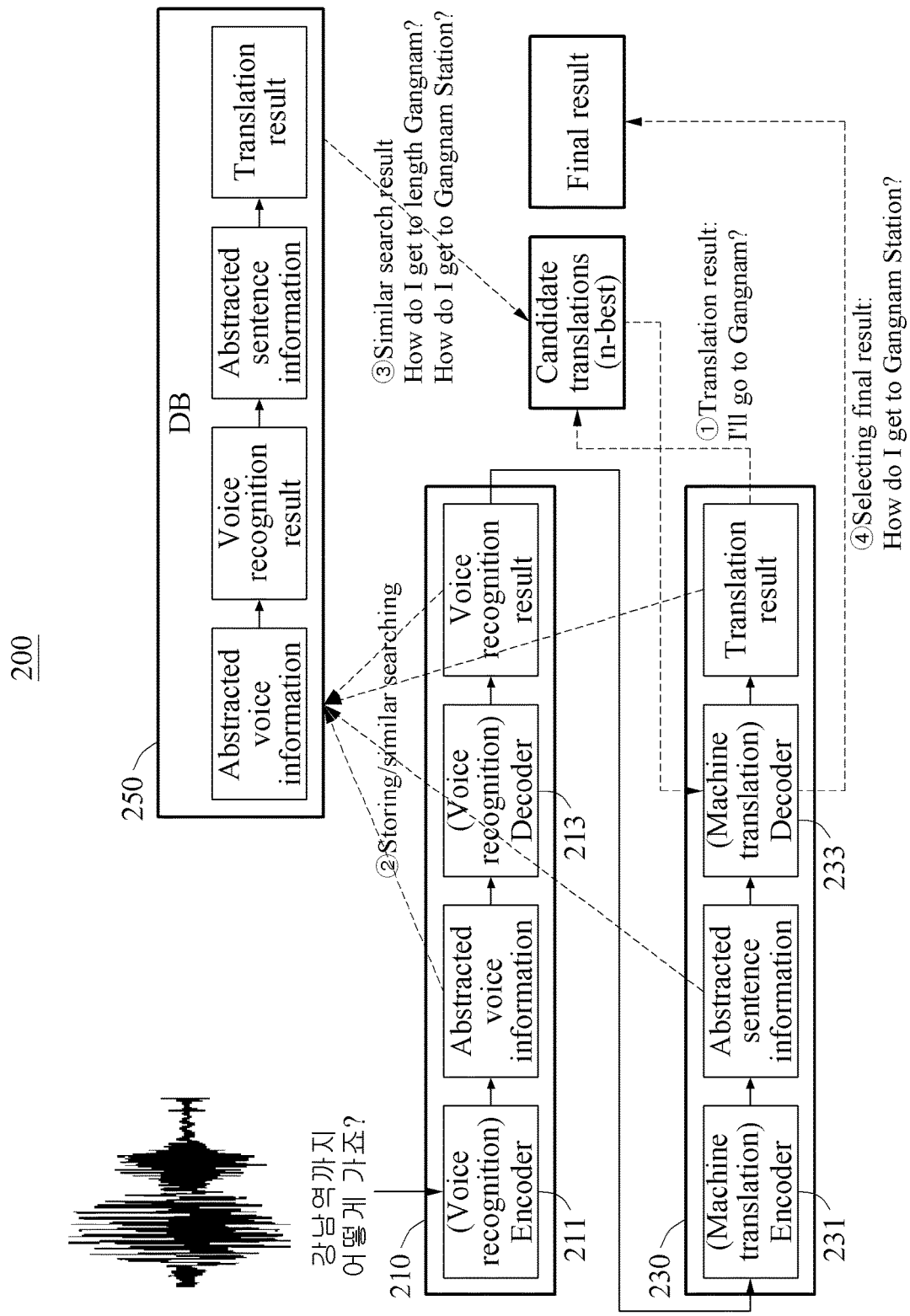
FIG. 2 illustrates an example of an automated interpretation apparatus and an example interpretation method thereof.

Referring to FIG. 2, as an example of the automated interpretation apparatus 130, an automated interpretation apparatus 200 may include a voice recognizer 210, a translator 230, and a database (DB) 250, for example.

The voice recognizer 210 may include an encoder 211 and a decoder 213 for voice recognition. The translator 230 may include an encoder 231 and a decoder 233 for machine translation.

The automated interpretation apparatus 200 may collect operative results and/or outputs of the encoder 211 and the decoder 213, included in the voice recognizer 210, and operative results and/or outputs of the encoder 231 and the decoder 233, included in the translator 230, and may store the such operative respective results and/or outputs in the database 250 while performing respective recognition and/or translation operations. The operative results and/or outputs of the voice recognizer may include, for example, abstracted voice information of an input voice signal, e.g., separated or extracted voice, acoustic, phoneme, morpheme, syntax, and/or context information from sampled voice frames, as only examples, and a voice recognition result for the input voice signal. The operative results and/or outputs of the translator 230 may include, for example, abstracted sentence information for the voice recognition result, e.g., such separated or extracted information for translation considerations, and a translation result for the voice recognition result based on the abstracted sentence information. Here, these examples of abstracted voice information and abstracted sentence information are only non-limiting examples, as other voice signal, acoustic information, and sentence or contextual information may be separated or extracted by operations of each of the voice recognizer 210 and translator 230, for example.

For example, when a voice signal of a user saying "강남역까지 어떻게 가죠 ?" is input to, or received by, the automated interpretation apparatus 200, the automated interpretation apparatus 200 provides features extracted from the voice signal to the voice recognizer 210 and acquires a voice recognition result from the voice recognizer 210. The voice recognition result may be a first language sentence corresponding to a voice of the user, which in this example may be a voice recognition in the Korean language.

The automated interpretation apparatus 200 provides the voice recognition result to the translator 230 and acquires an initial translation result from the translator 230. For example, the initial translation result of the voice recognition may be "I'll go to Gangnam?". In addition to "I'll go to Gangnam?", various other initial translation results of the translator 230 may also be generated. For example, one or more various initial translation results whose determined accuracy scores are above a first threshold may be selected. The automated interpretation apparatus 200 selects the initial translation result output by the decoder 233 of the translator 230 to be a candidate translation or a candidate sentence. The candidate translation is stored in, for example, an n-best candidate sentence list.

The automated interpretation apparatus 200 searches the database 250 for information elements similar to the operative results and/or outputs of the encoder 211, the encoder 231, the decoder 213, and the decoder 233 generated in the processes of recognizing and translating the input "강남역까지 어떻게 가죠?" voice signal. The searched information elements may be one of stored abstracted voice information, stored the voice recognition results, stored abstracted sentence information, and stored the translation results, e.g., from previous interpretation operations. In an example, the automated interpretation apparatus 200 may search the database 250 for final translation sentences, e.g., stored as the illustrated translation results in the database 250, matching or corresponding to the searched information elements that are found to be similar. For example, based on the found/determined similar information elements, the stored previous final translations of "How do I get to length Gangnam?" and "How do I get to Gangnam Station?" may be identified and added to the n-best candidate translations list, as candidate translations.

As such, the n-best candidate sentence list includes a sentence corresponding to the initial translation result and one or more other translation sentences acquired from the database 250. For example, the candidate sentence list may include a current translation result and previous translation results. Thus, in the present example, the candidate sentence list includes the sentences, "I'll go to Gangnam?", "How do I get to length Gangnam?", and "How do I get to Gangnam Station?".

The automated interpretation apparatus 200 scores each of the candidate sentence list to which the final sentences corresponding to similar translation results are added to acquire a final score for each of the candidate sentences. The automated interpretation apparatus 200 may calculate the respective final scores for the candidate sentences based on speech corresponding to a current interpretation target, i.e., the speech currently being interpreted. Here, the automated interpretation apparatus may have previously respectively scored any of the candidate sentences from the stored previous translation results, i.e., when performing their respective final translation operations for their respective previous interpretation targets. Accordingly, herein, when performing interpretation operations for a current interpretation target the automated interpretation apparatus 200 may be considered as recalculating or rescoring, i.e., calculating or scoring again, such previous translation results, but this time based on the current interpretation target. For example, the automated interpretation apparatus 200 may use the decoder 233 to recalculate the final scores for each of the candidate sentences based on the current interpretation target. In this example, the decoder 233 may assign a higher score to a translation result previously stored in the database 250 in comparison to the initial translation result obtained in a current translation process.

As another example, and as will be discussed in greater detail further below, FIG. 10 illustrates an example of a method of selecting a final second language sentence, where candidate sentences include results obtained by interpreting different speeches and thus, a score of speech corresponding to a current interpretation target is recalculated. For example, scores of the candidate sentences may be recalculated based on pre-generated abstracted sentence information corresponding to the current translation target.

In such examples, rescoring may be performed based on probability values given for each word (or generated as a result of a translation model, for example) in a process of decoding speech corresponding to the interpretation target. However, depending on embodiment, differing rescoring schemes may be employed, such as by replacing or interpolating, into a form of a weighted sum, a word probability value of another language model or an n-gram-based probability value (in consideration of a domain, a user, a nation, etc.), as only examples.

Thus, returning to FIG. 2, the automated interpretation apparatus 200 generates the illustrated final translation result based on the result of the rescoring of the candidate translations. For example, when the sentence "How do I get to Gangnam Station?" has a highest score in a rescoring result of translation results included in the candidate sentence list, the automated interpretation apparatus 200 selects the sentence "How do I get to Gangnam Station?" to be the final result of the automated interpretation apparatus 200.

A scenario of translating voice signals using the automated interpretation apparatus 200 will be further described with reference to the bellow Table 1, for example.

TABLE 1

| No. | Voice signal | Initial translation result | n-best | Final translation result |
|---|---|---|---|---|
| 1 | 강남역까지 이떻게 가나요? | How do I get to Gangnam? | How do I get to Gangnam? | How do I get to Gangnam station? |
| 2 | 맛있는 짜장면 집 알려주세요. | Tell us delicious jajangmyeon home. | Tell us delicious jajangmyeon home. | Tell us delicious jajangmyeon home. |
| 3 | 강남역까지 가는 길이 어떻게 되나요? | How do I get to length Gangnam? | How do I get to length Gangnam? How do I get to Gangnam? | How do I get to Gangnam station? |
| 4 | 강남으로 어떻게 가죠? | I'll go to Gangnam? | I'll go to Gangnam? How do I get to length Gangnam? How do I get to Gangnam? | How do I get to Gangnam station? |

When a voice signal 1 "강남역까지 어떻게 가나요?" is input to the automated interpretation apparatus 200, an initial translation result "How do I get to Gangnam?" of the translator 230 is determined to be a candidate translation, for example, in the 'n-best' column of Table 1 and then, stored in the candidate sentence list for the voice signal 1 because pre-stored information elements may be absent in the database 250, e.g., as other translations may not have been previously performed so there may be no initially stored information elements to search through database 250. In this example, the initial translation result may be provided as a final translation result of the automated interpretation apparatus 200.

When a voice signal 2 "맛있는 짜장면 집 알려주세요?" is later input, the automated interpretation apparatus 200 generates an initial translation result "Tell us delicious jajangmyen home." using the translator 230 and determines the initial translation result to be a candidate translation for voice signal 2. The automated interpretation apparatus 200 verifies whether an information element similar to the interpretation outputs exists in the database 250 in an initial translation process. For example, the automated interpretation apparatus 200 verifies whether any information elements similar to the abstracted voice information, the voice recognition result, the abstracted sentence information, and the translation result for voice signal 2 are present in the database 250. Because the database 250 does not yet include any information elements similar to the current voice signal 2 generated interpretation process outputs, no further candidate translations are additionally selected. Thus, in this example, the initial translation result is also provided as the final translation result of the automated interpretation apparatus 200 for voice signal 2.

When a voice signal 3 "강남역까지 가는 길이 어떻게 되나요?" is input, the automated interpretation apparatus 200 generates an initial translation result "How do I get to length Gangnam?" in the translator 230 and determines the initial translation result to be a candidate translation for voice signal 3. The automated interpretation apparatus 200 searches the database 250 for additional candidate translations. For example, the automated interpretation apparatus 200 may search the abstracted voice information, the voice recognition results, the abstracted sentence information, and the translation results from interpretation results for either or both of the voice signal 1 and voice signal 2. The automated interpretation apparatus 200 may search such previous interpretation results for information elements similar to the results or outputs generated in the current interpretation process of voice signal 3. Then, the previous translation sentence results corresponding any of the found matching or similar information in the abstracted voice information, the voice recognition results, the abstracted sentence information, and the translation results of database 250 are added to the candidate translations list. For example, the automated interpretation apparatus 200 may add a previous final translation sentence "How do I get to Gangnam?" to the candidate translation list, as a candidate translation, after determining that there are similarities between information elements for the current voice signal 3 and one or more stored information elements corresponding to the voice signal 1. In this example, the candidate sentence list includes the candidate translations "How do I get to length Gangnam?" and "How do I get to Gangnam?". The automated interpretation apparatus 200 calculates scores of the candidate translations included in the candidate sentence list with respect to the voice signal 3, and selects the candidate translation, for example, "How do I get to Gangnam?", as having a highest score from the candidate translations, to be the final translation result for the voice signal 3.

When a voice signal 4 "강남역까지 어떻게 가죠?" is input, the automated interpretation apparatus 200 generates an initial translation result "I'll go to Gangnam?" and determines the initial translation result to be a candidate translation for voice signal 4. The automated interpretation apparatus 200 searches for similar information elements in the stored interpretation results for voice signal 1, the stored interpretation results for voice signal 2, and the stored interpretation results for voice signal 3, in the database 250, based on the results and outputs generated up through the initial translation process in the current interpretation process for voice signal 4. Based on results of these searches the automated interpretation apparatus 200 determines that the final translation sentences "How do I get to Gangnam" and "How do I get to length Gangnam?", respectively corresponding to the translation results of the voice signal 1 and the voice signal 2, are also candidate translations for voice signal 4. In this example, one of these determined candidate translations, for example, "How do I get to Gangnam?", having a determined highest score among all of the determined candidate translations, e.g., as included in a candidate sentence list for voice signal 4, is selected to be the final translation result for voice signal 4.

When searching the database 250 for the information element or similar information elements, the automated interpretation apparatus 200 may use various algorithms separately or in combination. For example, the automated interpretation apparatus 200 may use an approximate k-nearest neighbor (k-NN) algorithm, or respective such algorithms, to quickly determine or retrieve from the database 250 information elements that are similar to the outputs of the encoder 211, the encoder 231, the decoder 213, and the decoder 233 from a current interpretation process. In an example, the automated interpretation apparatus 200 may also, or alternatively, use a locality sensitive hashing (LSH) algorithm and/or a greedy filtering algorithm for comparing outputs of the encoder 211, encoder 231, the decoder 213, and decoder 233 to information stored in the database 250 to identify additional candidate translations from previous interpretation operations. In addition, results of such searching of the database 250 may also be stored in the database 250 and available for refining current or future searches of the database 250.

In addition, or alternatively, the comparison by the automated interpretation apparatus 200 between outputs of the encoder 211, encoder 231, the decoder 213, and decoder 233 to information in the database 250 may include a method of determining whether a similarity exists between feature vectors, for example, a first feature vector and/or a second feature vector determined in a current interpretation process, and feature vectors in the database 250. For example, the abstracted voice information, the recognition results, and the abstracted sentence information may have been converted into respective information in high-dimensional vector forms, and respectively stored in the database 250. In an example, where the encoder 211 and decoder 213, as only example, include a neural network, e.g., recurrent neural network, and implement neural network learning to process voice recognition, a vector form generated as an intermediate result or a phoneme sequence may be a by-product of the neural network voice recognition process.

Here, as only another example, the automated interpretation apparatus 200 may calculate Euclidean distances between feature vectors stored in the database 250 and one or more feature vectors generated in current recognition or translation processes. Hereinafter, a feature vector generated in the current recognition or translation process is also referred to as a target feature vector. As only an example, the similarity determinations or comparisons for determining the candidate translations may be based on a set principle that a similarity between a target feature vector and a feature vector stored in the database 250 increases according to a decrease in a Euclidean distance therebetween, alternatively or in addition similarity determinations or comparisons may be based on a set principle that similarity decreases according to an increase in the Euclidean distance.

In addition, or alternatively, the automated interpretation apparatus 200 may determine whether the target feature vector is similar to the feature vectors stored in the database 250 based on a determined cosine similarity. For example the automated interpretation apparatus 200 may determine that a similarity between the target feature vector and the feature vector stored in the database 250 increases as the cosine similarity between the target feature vector and the feature vector stored in the database 250 is closer to '1'. Since a threshold for verifying the similarity may not easily be determined, the automated interpretation apparatus 200 may arrange the feature vectors stored in the database 250 in a descending order of similarity and determine that feature vectors corresponding to a predetermined percentage (%) in a highest (similarity) ranking or a predetermined number of the highest (ascended) arranged feature vectors are similar to the target feature vector and then store or identify the corresponding previous translation results for those determined feature vectors in the candidate translation list.

As only an example, a method of determining whether a similarity between sentences, for example, a first language sentence and a second language sentence is present may include the automated interpretation apparatus 200 determining whether the similarity between the sentences is present based on a term frequency-inverse document frequency (TF-IDF). The TF-IDF may be a statistic value indicating a frequency or an importance of a predetermined word in a document among a document group including a plurality of documents. A term frequency (TF) is a value indicating a frequency of a predetermined word in a document. Also, it is determined that an importance of the word in the document increases according to an increase in the value. When the word is frequently used through the document group overall, it is indicated that the word is commonly used. The foregoing example may be indicated by a document frequency (DF), and an inverse number of the DF may be an inverse document frequency (IDF). The TF-IDF may be a value obtained by multiplying the TF by the IDF.

In this example, the automated interpretation apparatus 200 converts a sentence into a vector based on the TF-IDF and compares similarities between vectors. Through this, the automated interpretation apparatus 200 determines whether a sentence generated in the current recognition or translation process is similar to sentences stored in the database 250. The sentence generated in the current recognition or translation process may also be referred to as a target sentence. Since a threshold for verifying the similarity may not be easily determined, the automated interpretation apparatus 200 may arrange the sentences stored in the database 250 in a descending order based on their similarity and determine that sentences corresponding to a predetermined percentage in a highest rank or a predetermined number of the highest arranged sentences are similar to the target sentence and then store or identify the corresponding previous translation results for those feature vectors in the candidate translation list.

Although not shown, features extracted from a voice signal may be additionally stored in the database 250 and the extracted feature may be additionally used to select the candidate translations, for example, the n-best candidate translations. For example, using feature vectors generated during the example neural network voice recognition process, similarity between two voice signals of different lengths or of changed lengths between speeches may be determined. In this example, similar portions may be compared to each other or a dynamic time warping scheme may be performed on a whole sequence so as to obtain a transformation between two sequences. Through this, a similarity between voice sequences having different lengths, for example, may be verified, and that similarity may be used to select candidate translations.

Figure 3:
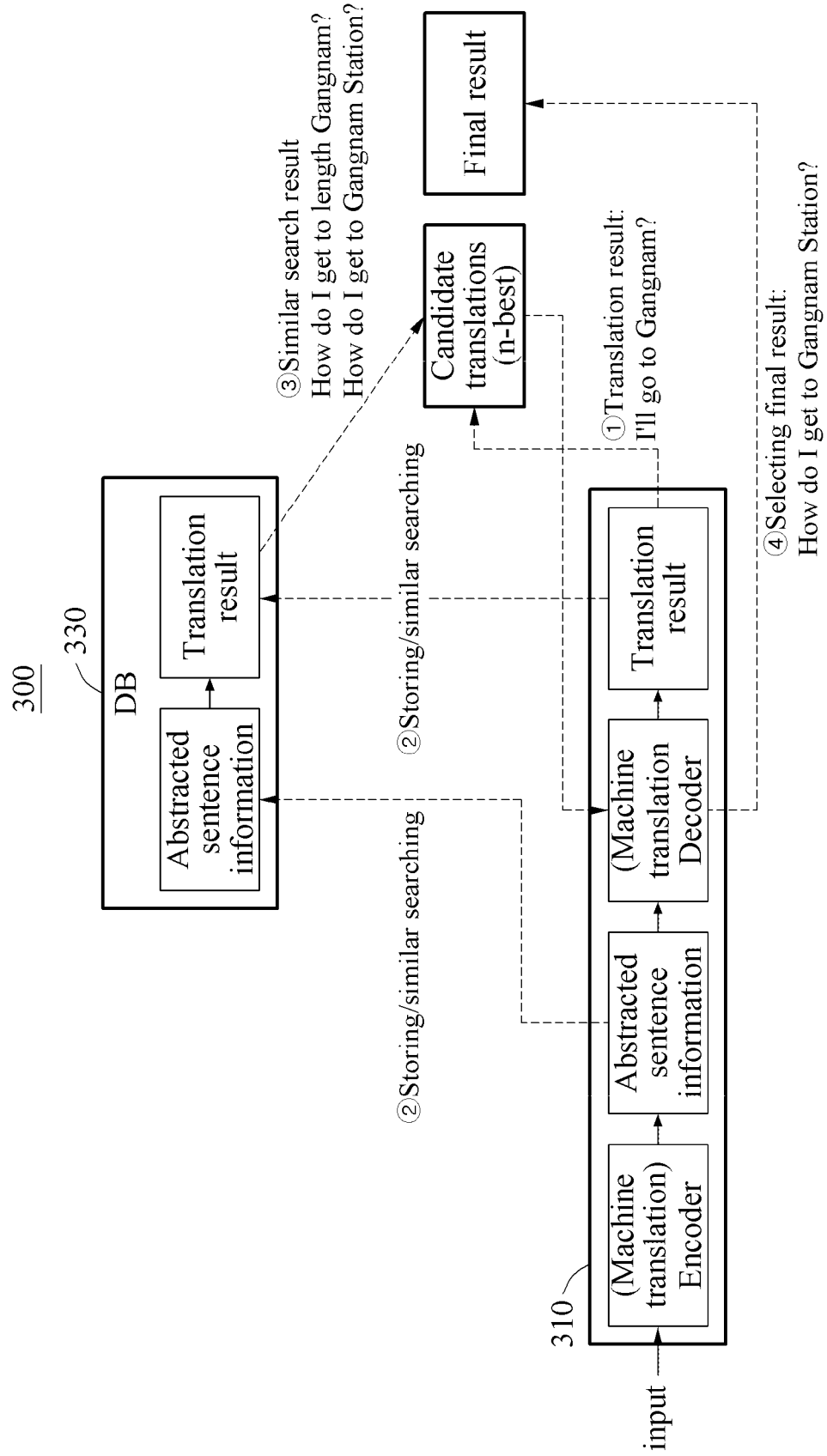
FIG. 3 illustrates an example of a machine translation apparatus and an example translation method thereof.

Referring to FIG. 3, as an example of the automated interpretation apparatus 130, a machine translation apparatus 300 performs machine translation and, depending on embodiment, may or may not include a recognizer or perform voice recognition. The machine translation apparatus 300 may include a translator 310 and a database (DB) 330, for example.

In FIG. 2, abstracted voice information and a voice recognition result of the voice recognizer 210 are stored in the database 250 and used to determine a translation candidate, for example, n-best translation candidates. In contrast, any available abstracted voice information and/or voice recognition results may or may not be used when the machine translation apparatus 300 performs translation only. An example first language sentence previously input to the translator 310 may be stored in the database 330. Also, the first language sentence, as well as any additional abstracted sentence information and translation results for any other previous translations, may be used to determine the translation candidates. The aforementioned descriptions provided with reference to the translator 230 and the database 250 of FIG. 2 are also applicable here, and thus, repetition of such corresponding descriptions of the same with respect to the translator 310 and the database 330 will be omitted for brevity.

Figure 4:
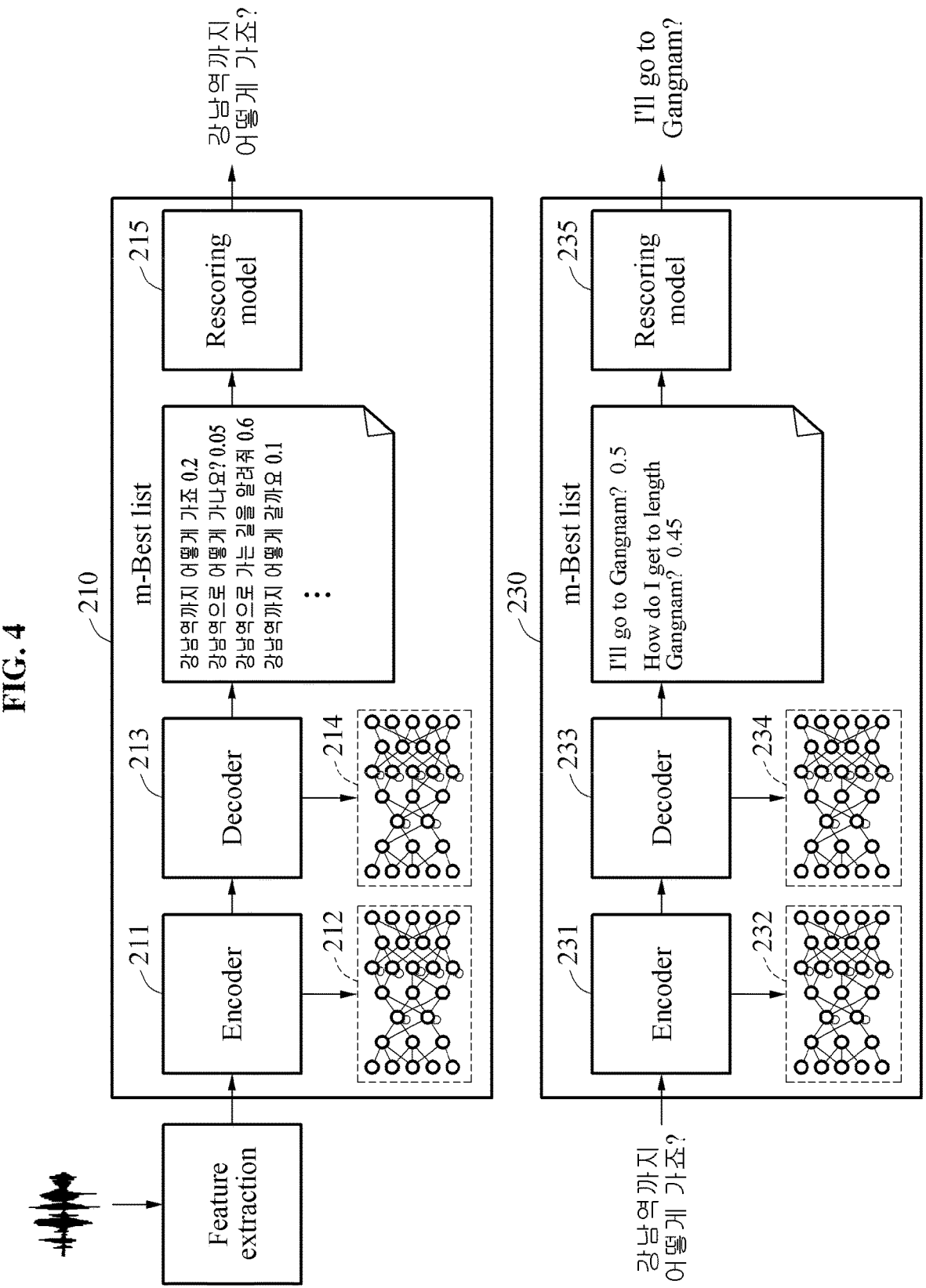
FIG. 4 illustrates an example operation and configuration of a translator and a voice recognizer in an automated interpretation apparatus according to one or more embodiments.

FIG. 4 illustrates an example of operations and configurations of a translator and a voice recognizer included in an automated interpretation apparatus. Referring to FIG. 4, an initial translation result for a voice signal of a first language input to an automated interpretation apparatus is output through operations of a voice recognizer 210 and a translator 230 and determined to be a candidate sentence of a second language for the voice signal. Here, the voice recognizer 210 and/or the translator 230, as well as the automated interpretation apparatus illustrated in FIG. 4, may be the same as those of FIG. 2, noting that embodiments are not limited to the same.

An encoder 211 of the voice recognizer 210 may include a neural network 212, and a decoder 213 of the voice recognizer 210 may include a neural network 214. Also, an encoder 231 of the translator 230 may include a neural network 232, and a decoder 233 of the translator 230 may include a neural network 234. The encoder 211, decoder 213, encoder 231, and/or decoder 233 of FIG. 4 may be the same as those of FIG. 2, noting that embodiments are not limited to the same. The neural network 212, the neural network 214, the neural network 232, and the neural network 234 may be in the same structure or one or more, or all, may be in different structures in the automated interpretation apparatus.

When the encoder 211, the encoder 231, the decoder 213, and the decoder 233 are each configured with a neural network, a learning process may be performed with each of the encoder 211, the encoder 231, the decoder 213, and the decoder 233 in advance to interpreting or translating a current voice input. In this example, operations of training the encoder 211, the encoder 231, the decoder 213, and the decoder 233 may be understood as an operation of determining weights or parameters of the neural network through learning operations. The learning operations may respectively be performed during manufacture and/or post manufacture using training data, and may also be available to be updated during operation of the automated interpretation apparatus In an example, in response to an input of a voice signal of the first language "강남역까지 어떻게 가죠?", the automated interpretation apparatus extracts features from the voice signal. A method of extracting features from the voice signal using the automated interpretation apparatus will be described in more detail with reference to FIG. 5.

In response to an input of the features extracted from the voice signal, the encoder 211 encodes the extracted features and generates a first feature vector, for example, a real number vector of {'2.542', '0.827', . . . , '5.936'}. The decoder 213 decodes the first feature vector generated by the encoder 211 and generates a first language sentence, for example, a sentence "강남역까지 어떻게 가죠?" as a voice recognition result. The decoder 213 outputs the first language sentence sub-word or word units. The sub-word may be understood as a sequence of characters frequently used in a common sentence, such as phonemes or syllables, as only examples. The neural network 212 of the encoder 211 and the neural network 214 of the decoder 213 will be described in greater detail with reference to FIGS. 6 and 7.

The decoder 213 decodes the first feature vector and generates an m-best list including m candidate sentences of the first language. The decoder 213 generates the m-best list of the first language based on, for example, a beam search algorithm. In this example, m may be a complexity of the beam search algorithm. The m-best list includes sentences corresponding to candidates for the voice recognition, in contrast to the n-best list of sentence (and/or phrase) candidates described with reference to FIGS. 2 and 3.

The m-best list includes first language sentences, for example, "강남역까지 어떻게 가죠?", "강남역으로 어떻게 가나요?", "강남역으로 가는 길을 알려줘", and "강남역까지 어떻게 갈까요?". Each sentence (and/or phrase) included in the m-best list also has a score or a probability value, for example, 0.6, 0.05, 0.2, and 0.1 that may be stored along with the sentence.

The voice recognizer 210 further includes a rescoring model 215. The rescoring model 215 scores the sentences or ranks the sentences based on their scores. The rescoring model 215 outputs one best sentence (or phrase) among the m sentences as a result of the voice recognition.

The encoder 231 of the translator 230 encodes the first language sentence "강남역까지 어떻게 가죠?" and generates a second feature vector. The encoder 231 uses the neural network 232 to encode the first language sentence to be the second feature vector.

The decoder 233 decodes the second feature vector and generates m-best list of the second language including m candidate sentences of the second language. The m-best list includes sentences (and/or phrases) corresponding to candidates for an initial translation, in contrast to the n-best list of sentence (and/or phrase) candidates described with reference to FIGS. 2 and 3. In this example, m may be a complexity of the beam search algorithm. The decoder 233 uses the neural network 234 to decode the second feature vector. The decoder 233 generates the m-best list based on, for example, a beam search algorithm.

In one example, an input dimension of the encoder 231 may be a dimension of a dictionary including sub-words of the first language and an output dimension of the decoder 233 may be a dimension of a dictionary including sub-words of the second language. The dimension of the dictionary may be the number of the sub-words included in the dictionary. An example configuration and operation of the neural network 232 included in the encoder 231 and an example configuration and operation of the neural network 234 included in the decoder 233 will be described with reference to FIG. 8.

The translator 230 may further include a rescoring model 235. For example, the rescoring model 235 selects a final sentence based on a value of probability or confidence that an original sentence for each candidate sentence is correctly translated into a translated sentence and an average of values of probabilities or confidences that the translated sentence is correctly translated into the original sentence. Also, the rescoring model 235 determines scores calculated in a process of decoding candidate sentences of the second language to be scores of the candidate sentences of the second language. For example, the score for each candidate sentence may be a value of probability or confidence that the original sentence was correctly translated into the corresponding candidate sentence. In this example, the rescoring model 235 may also be referred to as a ranking model.

Though not limited thereto, the rescoring model 235 may output only one best or highest scoring sentence among the m sentences. For example, the rescoring model 235 may output a candidate sentence "I'll go to Gangnam?" corresponding to the highest score, for example, 0.5 as an initial translation result.

FIG. 5 illustrates an example of a method of extracting features from a voice signal. Referring to FIG. 5, an automated interpretation apparatus may sample a voice signal of a first language based on a predetermined frame rate, for example, 100 frames per second. The sampling may be performed through one or more ADCs and parsers, as only an example. Thus, in an example, the automated interpretation apparatus extracts features $X_1, X_2, \ldots, X_i, \ldots, X_L$ in a unit of set frame, e.g., as respective frames each having a set frame length, and generates input vectors for each of plural frames. An input vector for each frame may include, for example, 40 points, such as the example 40-dimensional (dim) points.

Figure 6:
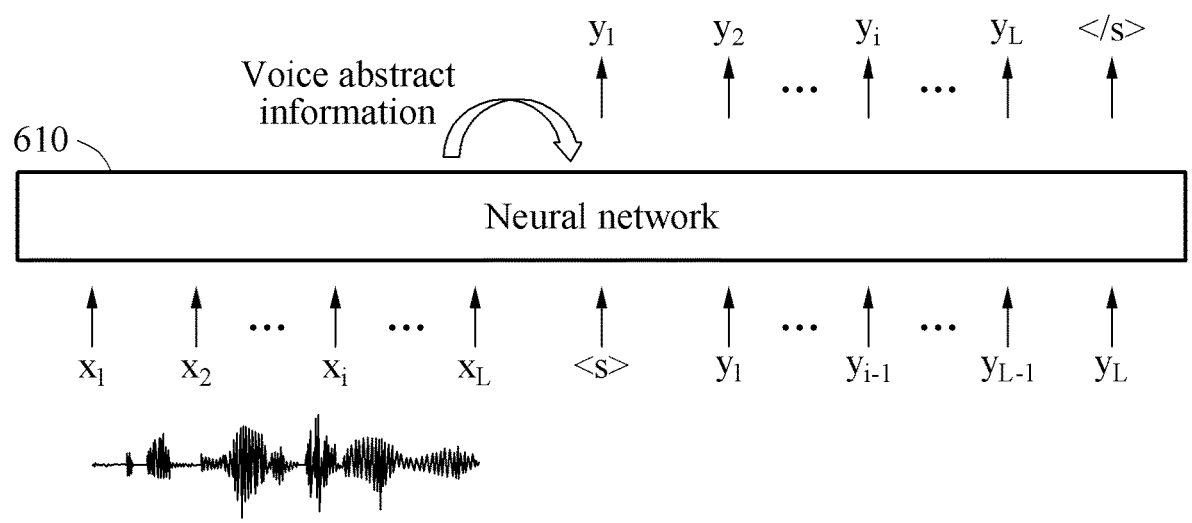
FIG. 6 illustrates an example of a voice recognition method of a voice recognizer according to one or more embodiments.

FIG. 6 illustrates an example of a voice recognition method of a voice recognizer 210. An example end-to-end voice recognition process performed in the voice recognizer 210 is illustrated with reference to FIG. 6. The voice recognizer 210 uses a neural network 610 provided in a structure including an encoder and a decoder. For example, the neural network 610 is a neural network in a form in which a neural network 212 and a neural network 214, such as described in the above example of FIG. 4, are combined as a single neural network. In an example, the neural network 610 may be a recurrent neural network. Here, the voice recognizer 210 may be the same voice recognizer of any of FIGS. 2 and 4, but is not limited thereto, and the referenced neural networks 212, 214 may be the same neural networks 212 and 214 of FIG. 4, but are not limited thereto.

The illustrated example input vectors $x_1, x_2, \ldots, x_i, \ldots, x_L$, e.g., generated corresponding to respective frames in FIG. 5 are sequentially input to an encoder portion or input of the neural network 610. The encoder portion of the neural network 610 may output voice abstract information, which may then, or also, be provided or input to a decoder portion or input of the neural network 610. The output voice abstract information corresponds to abstracted voice information and may be stored in a separate, as only an example, database, such as the database 250 of FIG. 2.

Thus, in an example, decoder portion of the neural network 610 may sequentially outputs sub-words $y_1, y_2, \ldots, y_i, \ldots, y_L$ included in a first language sentence. The output sub-words may then be re-input to the decoder portion of the neural network 610 so as to then be used for recognizing a subsequent sub-word, e.g., as a temporal feedback. The decoder portion of the neural network 610 may generate a predetermined number of sentence (and/or phrase) sequences and may select a sentence sequence (or phrase) having a highest set score among the number of sequences to be a first language sentence, e.g., the sentence "강남역까지 어떻게 가죠?". The recognized first language sentence corresponds to a voice recognition result and is stored in a database, which may be the same database the output voice abstract information is stored in, or may be a different database.

Figure 7:
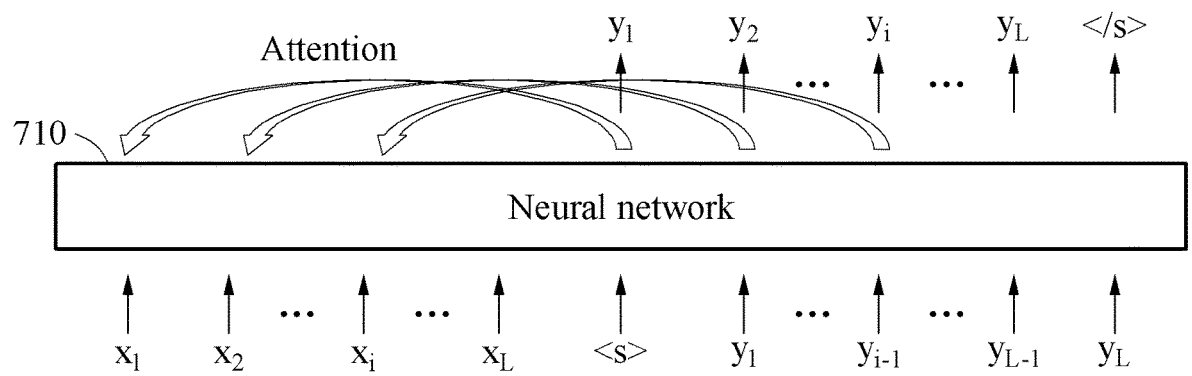
FIG. 7 illustrates an example of a voice recognition method.

FIG. 7 illustrates an example of a voice recognition method. A voice recognition process based on an attention mechanism is illustrated with reference to FIG. 7. Here, the voice recognizer 210 illustrated in FIG. 7 may be the same voice recognizer of any of FIGS. 2 and 4, but is not limited thereto, and the neural network 710 may be a combination of neural networks 212, 214 of FIG. 4, but are not limited thereto. When compared to the neural network 610 of FIG. 6, a decoder portion of a neural network 710 of FIG. 7 uses a large amount of information. For example, the decoder portion of the neural network 710 may use additional information as well as voice abstract information output by an encoder portion of the neural network 710 in a process of recognizing a subsequent sub-word. In this example, the additional information may be information generated while the encoder portion of the neural network 710 recognizes a voice. Thus, a portion to which the decoder portion of the neural network 710 'pays attention' in the process of recognizing the subsequent sub-word may be precisely verified. In one example, a structure of connection for the attention mechanism may be implemented as a separate neural network.

FIG. 8 illustrates an example of an operation and a structure of a neural network configuring a translator. An example configuration and operation of a neural network 232 included in an encoder of a translator 230 and an example configuration and operation of a neural network 234 included in a decoder of the translator 230 are illustrated with reference to FIG. 8. Here, the translator 230 may be the same translator 230 of any of FIGS. 2 and 4, but is not limited thereto, and the neural network 232 and/or the neural network 234 of FIG. 8 may be the same neural networks 232 and 234 of FIG. 4, but are not limited thereto.

The neural network 232 of FIG. 8 includes an input layer 810, a hidden layer 820, and an output layer 830. A dimension of the input layer 810 corresponds to a dimension of a sub-word of a first language. The first language is input to the input layer 810 in a form of one-hot vector based on a unit of sub-word. For example, when a first sub-word input to the encoder is '강남역', a binary '1' is input to a node corresponding to '강남역' among a plurality of nodes of the input layer 810 and a binary '0' is input to remaining nodes. A one-hot vector input to the input layer 810, for example, a vector to which the binary '1' is mapped to correspond to '강남역' is propagated through the hidden layer 820 to the output layer 830.

The neural network 232 of the encoder of FIG. 8 includes a recurrent neural network. Thus, an encoding result of at least one previous sub-word exerts influence on encoding sub-words after the second/subsequent sub-word. For example, when a second sub-word is '까지', a one-hot vector to which a binary '1' is mapped to correspond to '까지' is input to the input layer 810. In this example, when the one-hot vector is propagated through the hidden layer 820 to the output layer 830, nodes included in the hidden layer 820 additionally receive outputs of nodes having propagated a first sub-word in the hidden layer 820.

As such, a feature vector finally output in response to the sequential input of the sub-words of the first language to the input layer 810 of the neural network 232 is generated. The generated feature vector corresponds to abstracted sentence information and may be stored in a separate database, such as the database 250 of FIG. 2, as only an example. The feature vector finally output in the neural network 232 of the encoder is input to the neural network 234 of the decoder.

The neural network 234 of the decoder of FIG. 8 includes an input layer 850, a hidden layer 860, and an output layer 870. The neural network 234 decodes the feature vector finally output in the neural network 232 of FIG. 8 and generates a candidate sentence of a second language.

The input layer 850 of the neural network 234 receives the feature vector finally output from the encoder. The feature vector is propagated through the hidden layer 860 to the output layer 870. A dimension of the output layer 870 corresponds to a dimension of a dictionary including sub-words of the second language. Each node of the output layer 870 may correspond to a sub-word of the second language, and an output value of each node may indicate a probability or confidence that the sub-word of the corresponding node is a correctly translated output. In an example, the automated interpretation apparatus performing the beam search algorithm selects a predetermined number of, for example, three candidate sub-words and the number being determined by the decoder in a descending order. For example, three sub-words, from among 30000 sub-words, corresponding to the top three scores or probabilities $P_{1-1}$, $P_{1-2}$, and $P_{1-3}$ are propagated to a subsequent operation.

When the candidate sub-words are selected, a subsequent candidate sub-word is decoded to correspond to each of the candidate sub-words. In this example, similarly to the neural network 232 of the encoder of FIG. 8, state information of the hidden layer 860 of the neural network 234 in the decoder is transferred to a subsequent hidden layer of the hidden layer 860. For example, when an $i^{th}$ sub-word is to be determined, the neural network 234 determines a probability or a score of the $i^{th}$ sub-word based on the first sub-word through an $(i-1)^{th}$ sub-words.

In the aforementioned method, a sequence of the candidate sub-words is generated and a candidate sentence (or phrase) of the second language is constructed based on the sequence of the candidate sub-words. When the predetermined number of, for example, three candidate sub-words are selected every time that one sub-word is decoded, a number of final candidate sentences exponentially increases. To prevent or minimize such phenomenon, in one or more embodiments pruning may be applied to each such decoding process. The pruning is a selective removal performed to maintain the predetermined number of candidate sentences. For example, through the pruning, three candidate sentences are selected from nine candidate sentences generated by decoding up to the second sub-word and propagated to a subsequent process.

When a sub-word is selected in one process, a hidden layer of a subsequent process is changed by the selected sub-word. For example, an embedding vector indicating the selected sub-word may be applied to an internal status of nodes included in the hidden layer of the subsequent process.

FIG. 9 illustrates an example of a type of information stored in a database, such as the database 250 discussed above with regard to FIG. 2, though the database is not limited thereto. Referring to FIG. 9, an automated interpretation apparatus, such as any of the automated interpretation apparatuses of FIGS. 1-8 and 19-20B, may store abstracted voice information in vector form, a voice recognition result, and abstracted sentence information in vector form in the database. In this example, the abstracted voice information may be a first feature vector, the voice recognition result may be a first language sentence, and the abstracted sentence information may be a second feature vector. Also, the automated interpretation apparatus may perform a matching operation between at least one of an initial translation result, for example, a second language sentence, or a final translation result to the abstracted voice information, the voice recognition result, and the abstracted sentence information in the database and may store one or more matching results.

FIG. 10 illustrates an example of a method of selecting a final second language sentence, such as a final translation of a current voice signal in a first language or other final translation of a first language sentence when voice recognition is not performed, for example. Referring to FIG. 10, a score may be calculated for each of a first candidate sentence through an $n^{th}$ candidate sentence using a decoder of a machine translator. In this example, a neural network used to recalculate the score for each candidate sentence may be the neural network 234 of any of FIGS. 4 and 8, for example, noting that embodiments are not limited thereto.

Candidate sentences are obtained as translation results corresponding to different/previous speeches and thus, the scores of the candidate sentences are to be recalculated, i.e., calculated again, based on a speech corresponding to a current interpretation target. In one example, scores of the candidate sentences are recalculated based on abstracted sentence information previously generated to correspond to a speech that is a current translation target. A process of rescoring a first candidate sentence, for example, the above example "I'll go to Gangnam" of Table 1 in the example second language for a subsequent speech signal is described in more detail below.

Abstracted sentence information input to an input layer of the neural network 234 is propagated through a hidden layer to an output layer. Nodes included in the output layer correspond to sub-words, for example, "Gangnam", "I", and "will" (corresponding to the "'ll" of "I'll") of the second language. An output value of each of the nodes indicates a probability or confidence that a sub-word of the corresponding node is translated correctly and should be output.

When a first sub-word of a first candidate sentence is "I", an automated interpretation apparatus selects a probability $P_{1-1}$ output in a node corresponding to "I" to calculate a score of the first candidate sentence. When the node corresponding to the first sub-word is selected, the output layer of the neural network 234 outputs probabilities of second sub-words. As such, by sequentially selecting nodes in the output layer based on sub-words included in the first candidate sentence, the automated interpretation apparatus calculates the score of the first candidate sentence.

Based on the aforementioned method, the automated interpretation apparatus recalculates the scores of the candidate sentences. The automated interpretation apparatus selects a candidate sentence having a highest score among the scores recalculated on the first candidate sentence through an $n^{th}$ candidate sentence to be a final translation sentence (phrase) for the current input speech signal, for example.

Figure 11:
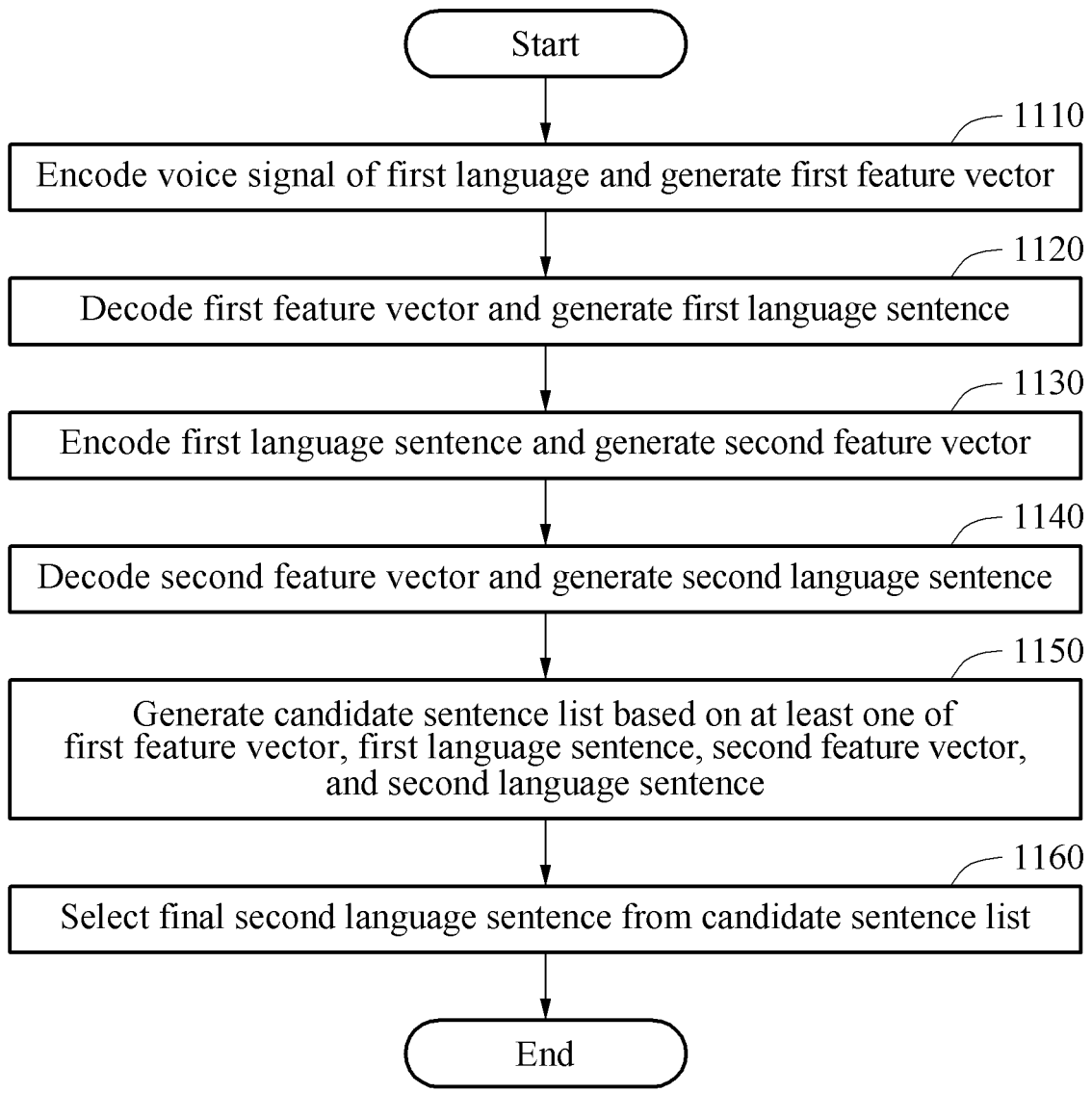
FIG. 11 illustrates an example of an automated interpretation method.

FIG. 11 illustrates an example of an automated interpretation method. Here, the method of FIG. 11 may be implemented by any of the automated interpretation apparatuses of FIGS. 1-10 and 19-20B, though embodiments are not limited thereto. In addition, corresponding descriptions of any one or any combination of the above operations discussed in FIGS. 1-10 are also applicable to the operations of FIG. 11 and are not repeated here merely for brevity purposes. Referring to FIG. 11, an automated interpretation apparatus encodes a voice signal of a first language and generates a first feature vector in operation 1110. In operation 1120, the automated interpretation apparatus decodes the first feature vector and generates a first language sentence. In operation 1130, the automated interpretation apparatus encodes the first language sentence and generates a second feature vector based on the encoding of the first language sentence. In operation 1140, the automated interpretation apparatus decodes the second feature vector and generates a second language sentence. In operation 1150, the automated interpretation apparatus generates, or adds to, a candidate sentence list based on at least one of the first feature vector, the first language sentence, the second feature vector, and the second language sentence and information of previous first language encoding and/or decoding recognition operations and/or second language encoding and/or decoding translation operations. In operation 1160, the automated interpretation apparatus selects a final second language sentence from the candidate sentence list.

The automated interpretation apparatus stores the first feature vector, the first language sentence, and the second feature vector from a current interpretation process in a database, such as the database 250 of FIG. 2. In an example, the database also stores the information of previous first language encoding and/or decoding recognition operations and/or second language encoding and/or decoding translation operations. The automated interpretation apparatus may also store one or both of the initial second language sentence and the final second language sentence from the current interpretation process in the database with information indicating the respective matching or correspondence of the second language sentence and/or final second language sentence to the stored first feature vector, first language sentence, and second feature vector from the current interpretation process.

The operations of FIG. 11 will be also described in greater detail with reference to FIGS. 12 through 17. The respective methods of FIGS. 12-17 may be implemented by any of the automated interpretation apparatuses of FIGS. 1-10 and 19-20B, though embodiments are not limited thereto.

Figure 12:
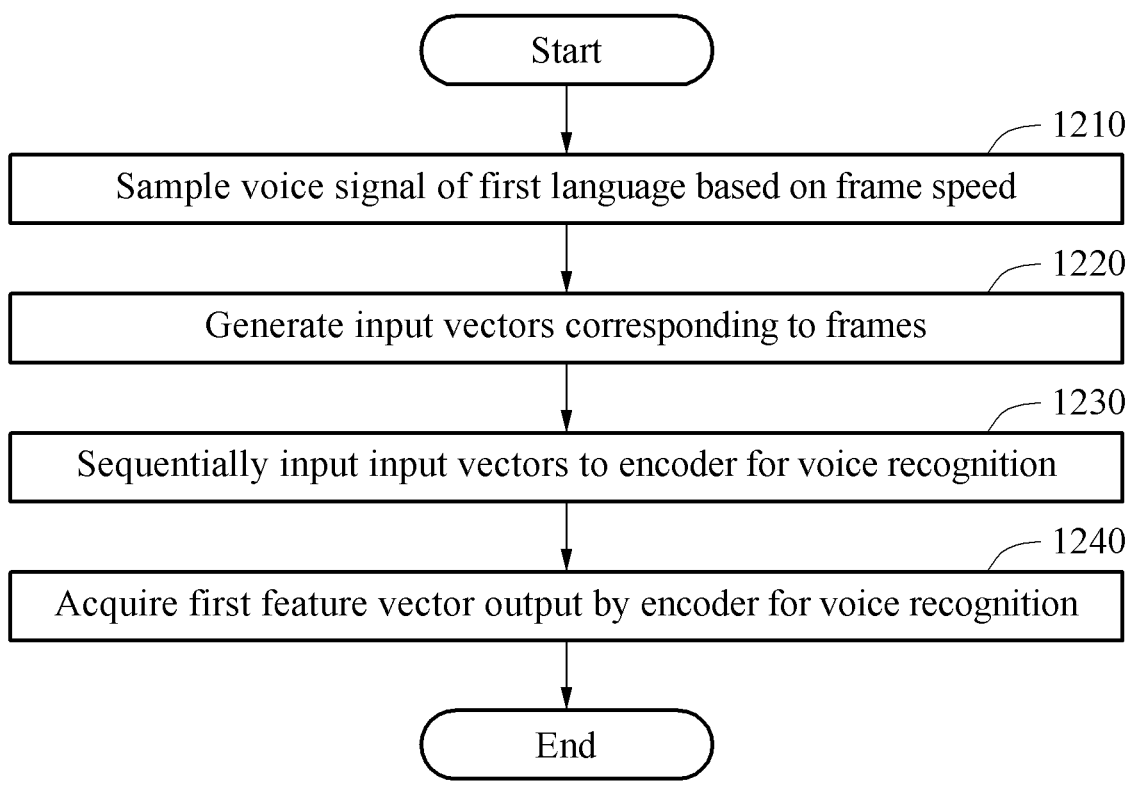
FIG. 12 illustrates an example of a method of generating a first feature vector.

FIG. 12 illustrates an example of a method of generating a first feature vector. Referring to FIG. 12, in operation 1210, an automated interpretation apparatus samples a voice signal of a first language based on a predetermined frame length/speed. For example, the automated interpretation apparatus samples the voice signal of the first language in a unit of 100 frames per second, e.g., corresponding to frame lengths of 10 ms. In operation 1220, the automated interpretation apparatus generates input vectors corresponding to each of the frames. In operation 1230, the automated interpretation apparatus sequentially inputs the generated input vectors to a voice recognition encoder for voice recognition. In operation 1240, the automated interpretation apparatus generates or acquires a first feature vector output by the voice recognition encoder for the voice recognition to correspond to the input vectors input sequentially.

Figure 13:
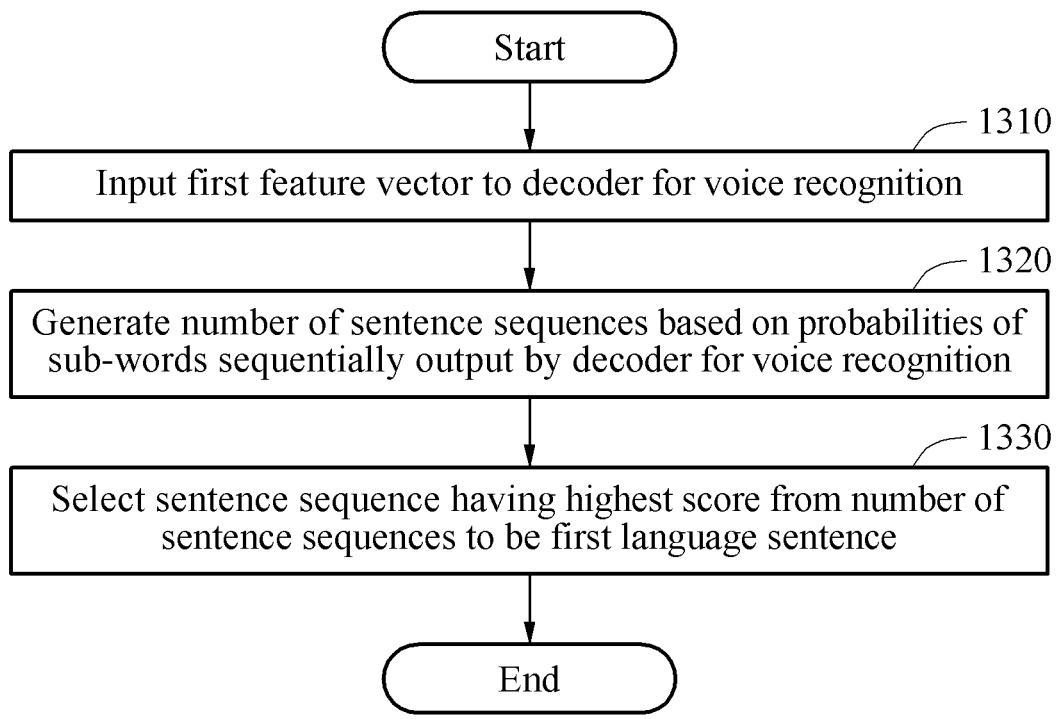
FIG. 13 illustrates an example of a method of generating a first language sentence.

FIG. 13 illustrates an example of a method of generating a first language sentence. Referring to FIG. 13, in operation 1310, an automated interpretation apparatus inputs a first feature vector to a voice recognition decoder for voice recognition. As only an example, the first feature vector could have been generated/acquired in operation 1240 of FIG. 12. In operation 1320, the automated interpretation apparatus generates a predetermined number of sentence (or phrase) sequences based on determined probabilities or scores of words or sub-words sequentially generated or determined by the voice recognition decoder. In operation 1330, the automated interpretation apparatus selects a sentence sequence having a highest score from the predetermined number of the sentence sequences to be the recognized first language sentence.

Figure 14:
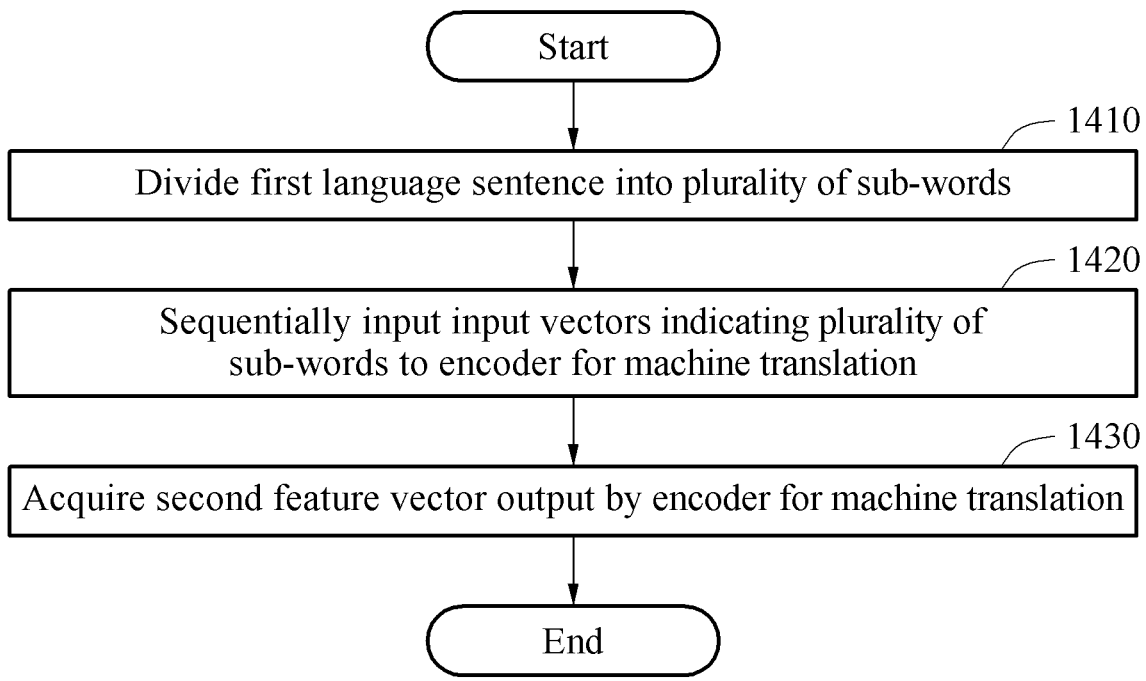
FIG. 14 illustrates an example of a method of generating a second feature vector.

FIG. 14 illustrates an example of a method of generating a second feature vector. Referring to FIG. 14, in operation 1410, an automated interpretation apparatus divides a first language sentence into a plurality of sub-words. As only an example, the first language sentence may be the recognized first language sentence from operation 1330 of FIG. 13. In operation 1420, the automated interpretation apparatus sequentially inputs input vectors indicating the plurality of sub-words to a translation encoder for machine translation of the first language sentence. In operation 1430, the automated interpretation apparatus generates or acquires a second feature vector, e.g., with respect to the second language, output by the translation encoder.

Figure 15:
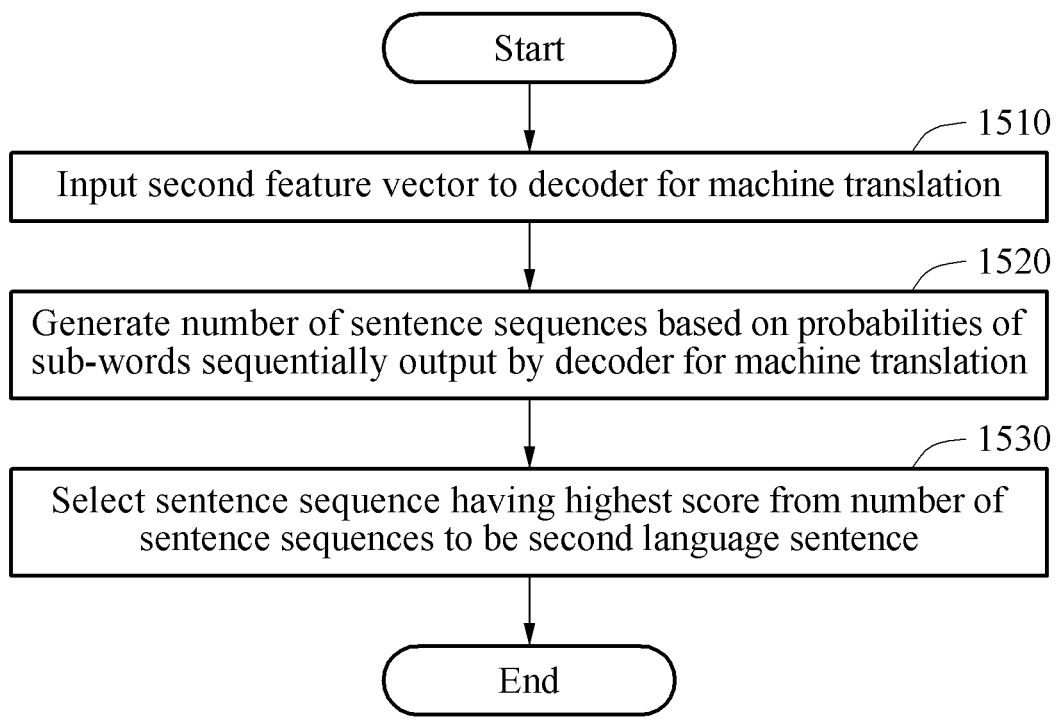
FIG. 15 illustrates an example of a method of generating a second language sentence.

FIG. 15 illustrates an example of a method of generating a second language sentence. Referring to FIG. 15, in operation 1510, an automated interpretation apparatus inputs the second feature vector to a translation decoder for machine translation. As only an example, the second feature vector may be the second feature vector of operation 1430 of FIG. 14. In operation 1520, the automated interpretation apparatus generates a predetermined number of sentence (phrase) sequences based on probabilities of words or sub-words, in the second language, sequentially generated or determined by the translation decoder. In operation 1530, the automated interpretation apparatus selects the sentence sequence having a highest score from the predetermined number of sentence sequences to be the translated second language sentence.

Figure 16:
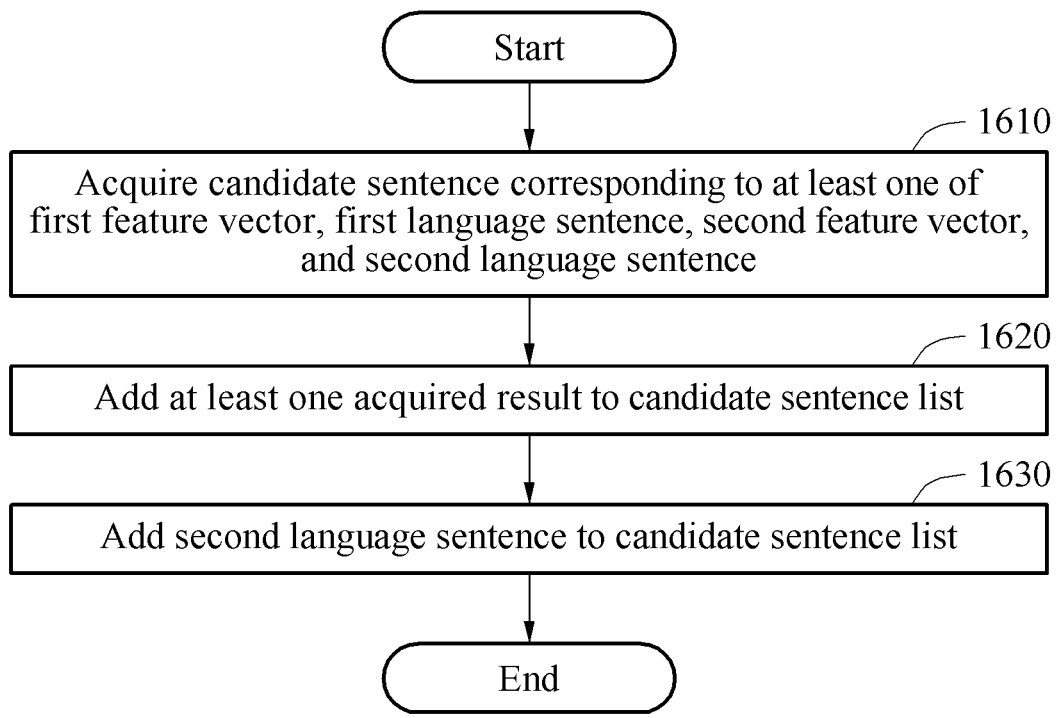
FIG. 16 illustrates an example of a method of generating a candidate sentence list.

FIG. 16 illustrates an example of a method of generating a candidate sentence list, such as any of the candidate sentence lists discussed in differing embodiments above. Referring to FIG. 16, in operation 1610, an automated interpretation apparatus acquires a candidate sentence, from a database, corresponding to at least one of a first feature vector, a first language sentence, a second feature vector, and a second language sentence for a recognition and translation of a current voice signal. For example, the automated interpretation apparatus searches a plurality of information elements stored in the database for an information element similar to at least one of the first feature vector, the first language sentence, the second feature vector, and the second language sentence. The automated interpretation apparatus acquires a candidate sentence corresponding to the found information element in the database. In operation 1620, the automated interpretation apparatus adds at least one candidate sentence acquired in operation 1610 to the candidate sentence list. In operation 1630, the automated interpretation apparatus adds the second language sentence to the candidate sentence list. As only an example, the second language sentence may be the translated second language sentence of operation 1530 of FIG. 15.

Figure 17:
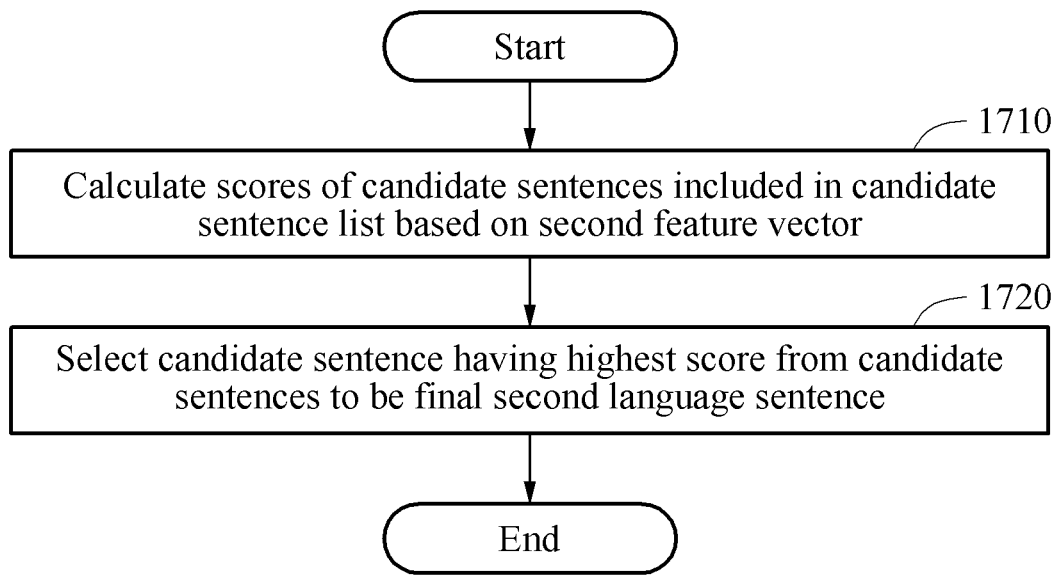
FIG. 17 illustrates an example of a method of selecting a final second language sentence.

FIG. 17 illustrates another example of a method of selecting a final translated second language sentence. Referring to FIG. 17, in operation 1710, an automated interpretation apparatus calculates scores of candidate sentences included in a candidate sentence list based on a second feature vector. As only an example, the candidate sentence list may be the same candidate sentence list for the operations of FIG. 16. In operation 1720, the automated interpretation apparatus selects a candidate sentence having a highest score from the candidate sentences of the candidate sentence list to be the final translation second language sentence.

Figure 18:
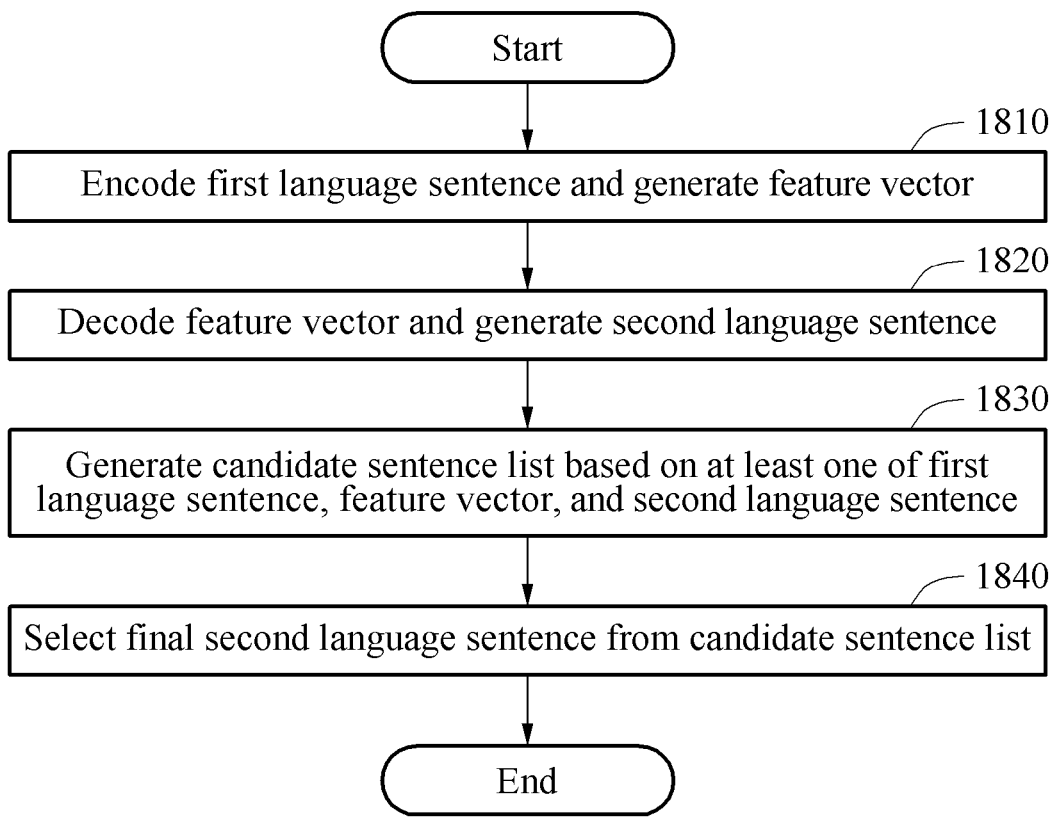
FIG. 18 illustrates an example of a machine translation method.

FIG. 18 illustrates an example of a machine translation method. The operations of FIG. 18 may be implemented by any of the automated interpretation apparatuses of FIGS. 1-10 and 19-20B, though embodiments are not limited thereto. Referring to FIG. 18, in operation 1810, a machine translation apparatus encodes a first language sentence and generates a feature vector. The machine translation apparatus may correspond to any of the automated interpretation apparatuses of FIGS. 1-2, 4-10, and 19-20B, where both voice recognition and language translation are performed or where only language translation is available or selectively performed, as only examples. In an example, the machine translation apparatus may correspond to the machine translation apparatus 300 of FIG. 3, noting that embodiments are not limited thereto. In operation 1820, the machine translation apparatus decodes the feature vector and generates a second language sentence. In operation 1830, the machine translation apparatus generates a candidate sentence list for candidate second translation sentences based on at least one of the first language sentence, the feature vector, and the second language sentence for the translation of the first language sentence. In operation 1840, the machine translation apparatus selects a final second language sentence from the candidate sentence list as a final translation of the first language sentence.

The machine translation apparatus stores the feature vector in a database. Also, the machine translation apparatus stores one or both of the second language sentence and the final second language sentence matching/corresponding to the feature vector in the database.

Herein, though the interpretation processes have been discussed with respect to translation of information in a first language to sentences or phrases in a second language, embodiments are not limited thereto. In one or more examples, the illustrated translators in the automated interpretation apparatus or machine translation apparatus may be representative of plural translators, each translators being configured as discussed to translate sentence information from the first language or another language into the second language or other languages, e.g., other than the above English second language examples. Multiple different translation processes may also be performed selectively and/or simultaneously. In addition, the different translation processes may further be automatically or selectively performed as automatic background processes of the underlying device to provide results of such translation operations to a user when/if the user desires or the underlying interactive agent of the device determines the user would need or desire.

Figure 19A:
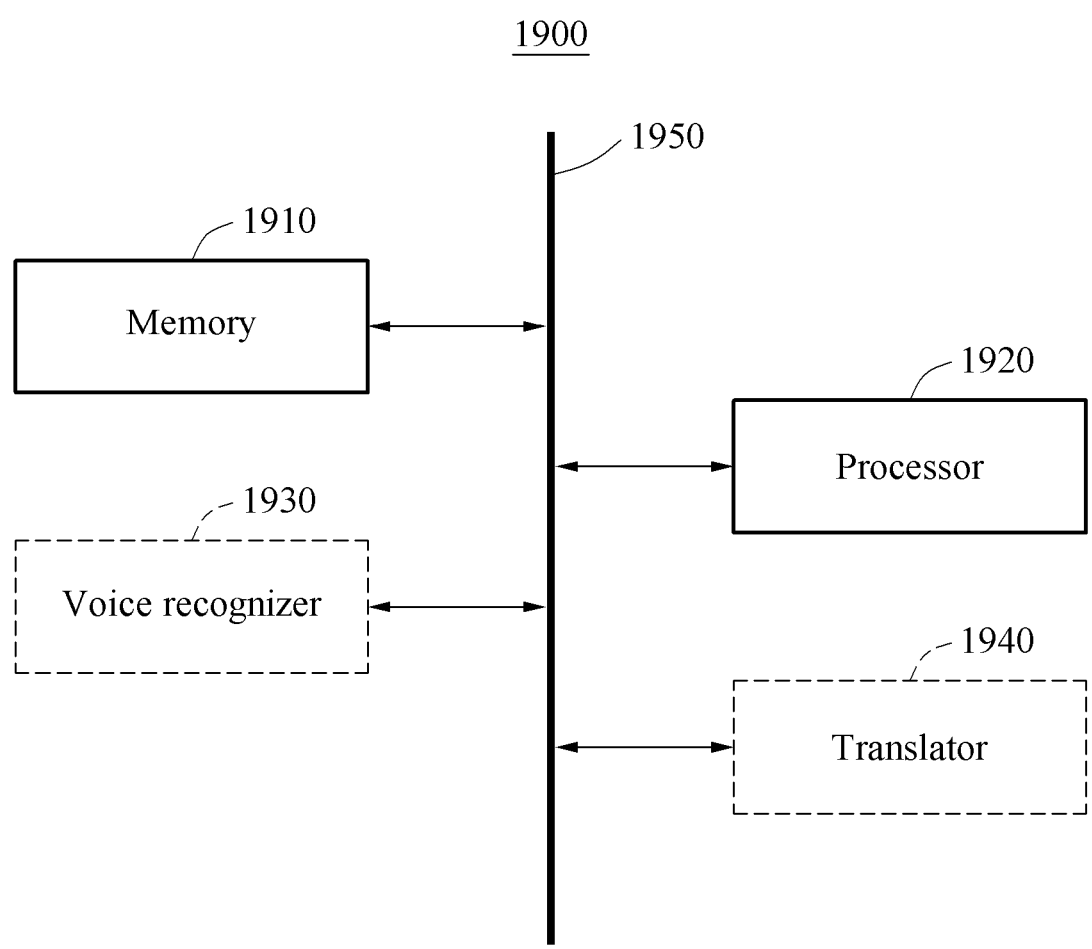
FIGS. 19A and 19B illustrate examples of automated interpretation apparatuses.
Figure 19B:
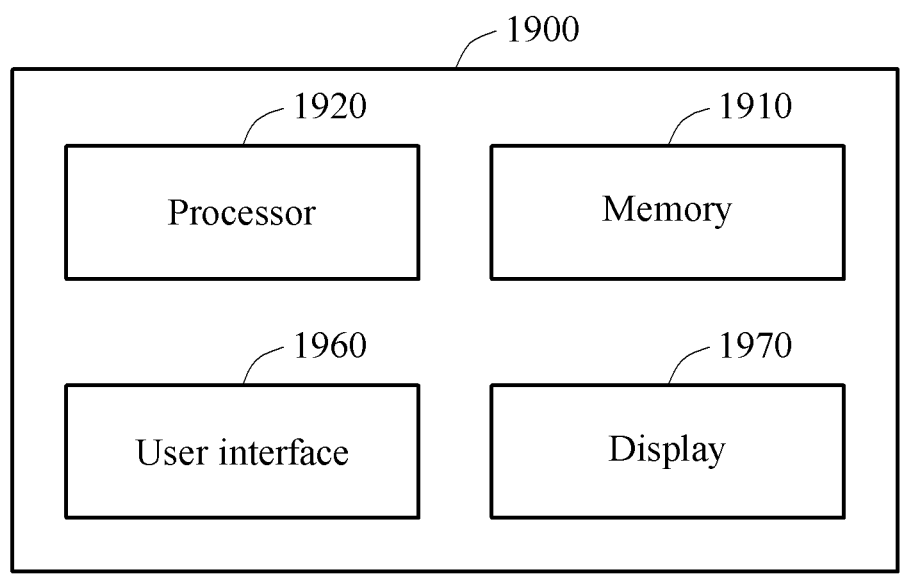

FIGS. 19A and 19B illustrate examples of automated interpretation apparatuses. The automated interpretation apparatuses of FIGS. 19A and 19B may perform any one or any combination of the operations described above with regard to FIGS. 1-18, noting that embodiments are not limited to the same. In addition, the automated interpretation apparatuses of FIGS. 19A and 19B may correspond to any one or any combination of the automated interpretation apparatuses of FIGS. 1-4 and 6-8, noting that embodiments are not limited to the same. Referring to FIGS. 19A and 19B, the respective automated interpretation apparatuses 1900 include a memory 1910 and a processor 1920. The automated interpretation apparatuses 1900 may further include a voice recognizer 1930 and/or a translator 1940, such as illustrated in FIG. 19A. Alternatively, the voice recognizer 1930 and/or the translator 1940 may be included in the processor 1920 as configured. In addition, as only an example, the respective automated interpretation apparatuses 1900 may include the translator 1940 and not include the voice recognizer 1930, or may include the voice recognizer 1930 and not include the translator 1940. In an example, the memory 1910, the processor 1920, the voice recognizer 1930, and the translator 1940 communicate with one another through a bus 1950, such as illustrated in FIG. 19A.

The memory 1910 includes a volatile memory and a non-volatile memory to store information received through the bus 1950, for example. The memory 1910 includes a database configured to store a first feature vector, a first language sentence, a second feature vector, and a second language sentence generated in a process of automated interpretation, such as in any or any combination of processes discussed above with respect to FIGS. 1-18. The memory 1910 stores the second language sentence and/or a final second language sentence matching the first feature vector, the first language sentence, and the second feature vector in the database. The memory 1910 also stores various types of data and programs. In an embodiment, as a non-transitory computer readable storage medium, the memory 1910 may store instructions that, when executed by the processor 1920, for example, cause the processor 1920 to perform any or any combination of the aforementioned processes regarding FIGS. 1-18. Alternatively, another memory may be included in the respective automated interpretation apparatuses 1900 and may store the instructions and/or another processor of the respective automated interpretation apparatuses 1900 may execute the stored instructions.

The processor 1920 may perform an operation of the agent 133 described with reference to FIG. 1. For example, in one or more embodiments, the processor 1920 transfers a voice of a user, e.g., captured by a microphone represented by the user interface 1960 of the automated interpretation apparatus 1900 of FIG. 19B, to the voice recognizer 1930 and receives the first feature vector and the first language sentence from the voice recognizer 1930. Also, in one or more embodiments, the processor 1920 transfers the first language sentence to the translator 1940 and receives the second feature vector and the second language sentence from the translator 1940. In one or more embodiments, the processor 1920 may be, or configured to be, a controller configured to control performances of such transferences and/or respective operations of the voice recognizer 1930 and transmitter 1940 to respectively generate the first feature vector and the first language sentence and generate the second feature vector and the second language sentence. In addition, in one or more embodiments the processor 1920, or another processor, may perform sampling of the voice of the user and provision of the resulting sampled audio frames to the voice recognizer 1930.

The processor 1920 may acquire candidate sentences from the database of the memory 1910 based on any one or any combination of the first feature vector, the first language sentence, the second feature vector, and the second language sentence of a current recognition and/or translation operation, for example. The processor 1920 may transfer the candidate sentences and the second feature vector to a decoder of the translator 1940 and receive scores of the candidate sentences from the decoder of the translator 1940, e.g., as determined or calculated by the decoder of the translator 1940. The processor 1920 may also select a final sentence from the candidate sentences based on the scores.

In one example, the voice recognizer 1930 and the translator 1940 are implemented independently of the processor 1920. In this example, the voice recognizer 1930 and the translator 1940 are implemented using processor or computing resources differing from the processor 1920, and may be implemented by the same processor or computing resources or by different processor or computing resources. In addition, in an embodiment, the voice recognizer 1930 and the translator 1940 are located external or remote from the respective automated interpretation apparatuses 1900 and communicate with the respective automated interpretation apparatuses 1900 through a wired or wireless network, for example. The user interface 1960 illustrated in FIG. 19B may be representative of hardware wired and/or wireless communication modules, as well as other user interface devices, such as a keyboard, touch screen, mouse, or stylus, as only examples. In such external or remote examples, the processor 1920 may perform the sampling of the voice of the user, such as of an analog signal captured by the microphone represented by the user interface 1960, and then using the hardware communication module(s) communicate the same to one or more external servers, as only an example, that respectively include the voice recognizer 1930 and/or the translator 1940. The final second language translation may be determined from a candidate sentence list by the translator 1940, for example, which may communicate the final second language translation to the processor 1920 of the respective automated interpretation apparatuses 1900, which may be further configured to then output the translation to the user either visually and/or audibly. For example, the user interface 1960 may represent a voice synthesizer and speaker that audibly outputs the translation, and/or the display 1970 may visually display the translation through text on the screen of the display 1970.

In an example, the voice recognizer 1930 and the translator 1940 are implemented through the processor 1920 and the memory 1910, such as through recognition and translation modeling. For example, one or more neural networks included in the voice recognizer 1930, including an example where respective neural networks are included in an encoder and a decoder of the voice recognizer 1930, and/or one or more neural networks included in the translator 1940, including an example where respective neural networks are included in an encoder and a decoder of the translator 1940, may be stored in the memory 1910. In an example, each of the neural networks may be stored in the memory 1910 in a form of executable object file or execution file, as only examples. In addition, parameters for each of the neural networks may also be stored in the memory 1910. In such examples, the processor 1920 loads the neural networks from the memory 1910 and applies the parameters for each of the neural networks, thereby implementing recognition of the voice recognizer 1930 and translation of the translator 1940. In another example, the processor 1920 loads the neural networks from the memory 1910 and applies the parameters for each of the neural networks, thereby implementing the encoder and the decoder of the voice recognizer 1930 and the encoder and the decoder of the translator 1940.

In another example, the processor 1920 may encode frames of the sampled voice signal in a first language and generate the first feature vector with respect to the first language. The processor 1920 may then decode the first feature vector and generate the first language sentence in the first language. The processor 1920 may encode the first language sentence with respect to a second language and generate the second feature vector with respect to the second language. The processor 1920 may then decode the second language vector and generate the second language sentence in the second language. The processor 1920 may select a final second language sentence from a candidate sentence list, e.g., generated by the processor 1920 based on any one or any combination of the first feature vector, the first language sentence, the second feature vector, and the second language sentence. Referenced outputs or results generated in voice recognition processes and referenced outputs or results generated in machine translation processes may be transferred to the memory 1910. In addition, though embodiments may discuss that any of such outputs or generated results may be transferred between the processor 1920, the voice recognizer 1930, and/or the translator 1940, embodiments also include the respective processor 1920, voice recognizer 1930, and/or translator 1940 storing their respective outputs or results to local caches, the memory 1910, or any other memories so as to be available for acquiring or requesting from such local caches, the memory 1910, or other memories by any of the processor 1920, voice recognizer 1930, and/or translator 1940.

The agent 133, translator 136, automated interpretation apparatus 130, automated interpretation apparatus 200, voice recognizer 210, encoder 211, decoder 213, translator 230, encoder 231, decoder 233, database 250, rescoring model 215, rescoring model 235, neural network 212, neural network 214, neural network 232, neural network 234, machine translation apparatus 300, translator 310, database 330, neural network 610, neural network 710, automated interpretation apparatuses 1900, memories 1910, processors 1920, voice recognizer 1930, translator 1940, bus 1950, user interface 1960, and display 1970 in FIGS. 1-4, 6-7, and 19A-19B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

In one or more embodiments, the methods and processes illustrated in FIGS. 1-18 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As non-exhaustive examples only, and in differing embodiments, an automated interpretation apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a stationary device, such as a desktop PC, a high-definition television (HDTV), a DVD player, a Blu-ray player, a set-top box, or a home appliance, or any other mobile or stationary device configured to perform wireless or network communication. For example, such automated interpretation discussed herein may be implemented in hardware, such as a mobile device, television, or PC, implementing video conferencing, such as to output and display subtitles in real time with a concurrent video conference. The automated interpretation apparatus or system according to one or more embodiments may be a vehicle, a public transportation kiosk or interface, or other user interface. In another example, a mobile device according to one or more embodiments may be configured to automatically interpret public announcements, such as in public transportation systems or audible public warning systems. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard. These examples are for demonstrative purposes and should not be interpreted as limiting of application or implementation of the automated interpretation apparatus or system.

While this disclosure includes specific examples, it will be apparent after an understanding of the disclosure of this application t that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented interpretation method for translating a sentence from a first language to a second language, the first language and the second language being natural languages, the method comprising:
    receiving a voice signal as an input, the voice signal being an input source sentence uttered in the first language;
    encoding, using a voice recognition encoder, the voice signal by extracting abstracted voice information from the voice signal to generate a first feature vector using the abstracted voice information, the abstracted voice information being stored in a database;
    providing the first feature vector to an input layer of a voice recognition decoder;
    decoding, using the voice recognition decoder, the first feature vector to generate a first language sentence in the first language, the first language sentence being stored in the database and corresponding to the abstracted voice information;
    encoding, using a machine translation encoder, the first language sentence by extracting abstracted sentence information from the first language sentence to generate a second feature vector with respect to the second language using the abstracted sentence information, the abstracted sentence information being stored in the database and corresponding to the abstracted voice information;
    providing the second feature vector to an input layer of a machine translation decoder;
    decoding, using the machine translation decoder, the second feature vector to generate a second language sentence in the second language;
    generating a candidate sentence list to include the second language sentence and one or more previous translation final second language sentences, being retrieved from the database, based on any one or any combination of the first feature vector, the first language sentence, and the second feature vector,
        wherein the one or more previous translation final second language sentences are previously generated, based on respective previous second feature vectors, through previous recognition-translation processes performed using the machine translation decoder, and are previously stored in the database,
        wherein the one or more previous translation final second language sentences are determined to be similar to the input source sentence based on a comparison of the abstracted sentence information of the input source sentence and abstracted sentence information of plural previous translation final second language sentences previously stored in the database, and
        wherein the voice recognition encoder, the voice recognition decoder, the machine translation encoder, and the machine translation decoder are implemented in neural networks being trained; and
    selecting, from the candidate sentence list, a final second language sentence as a translation of the input source sentence corresponding to the input voice signal,
    wherein the generating of the candidate sentence list includes:
        acquiring a first interpretation result matching a first language feature vector, from the database, determined similar to the first feature vector;

acquiring a second interpretation result matching a previous recognized sentence, from the database, determined similar to the first language sentence; and acquiring a third interpretation result matching a second language feature vector, from the database, determined similar to the second feature vector, and wherein the generating of the candidate sentence list further includes adding any of previous translation sentences corresponding to any of the first interpretation result, the second interpretation result, and the third interpretation result to the candidate sentence list.

2. The method of claim 1, wherein the generating of the candidate sentence list includes acquiring a candidate sentence, from the database, determined to correspond to any one or any combination of the first feature vector, the first language sentence, and the second feature vector from the database.

3. The method of claim 2, wherein the acquiring of the candidate sentence includes retrieving respective elements determined similar to any of the first feature vector, the first language sentence, and the second feature vector from a plurality of elements stored in the database based on one or more approximate nearest neighbor (NN) algorithms.

4. The method of claim 1, wherein the acquiring of the second interpretation result includes:
converting the first language sentence into a vector; and
determining which of plural previous recognized sentences, from the database, are similar to the first language sentence based on the vector.

5. The method of claim 1, wherein the selecting of the final second language sentence includes:
calculating scores of candidate sentences included in the candidate sentence list based on the second feature vector; and
selecting a candidate sentence, from the candidate sentence list, having a highest of the calculated scores to be the final second language sentence.

6. The method of claim 1, wherein the generating of the first feature vector includes:
sampling the voice signal in the first language based on a predetermined frame length;
generating respective input vectors corresponding to frames;
sequentially inputting the respective input vectors to the voice recognition encoder used for voice recognition; and
determining the first feature vector to be an output from the voice recognition encoder for the sequentially input respective input vectors.

7. The method of claim 1, wherein the generating of the first language sentence includes:
inputting the first feature vector to another voice recognition decoder used for voice recognition;
generating a predetermined number of sentence sequences based on probabilities of sub-words sequentially output from the other decoder; and
selecting a sentence sequence having a highest score among the predetermined number of sentence sequences to be the first language sentence.

8. The method of claim 1, wherein the generating of the second feature vector includes:
dividing the first language sentence into a plurality of sub-words;
sequentially inputting input vectors respectively indicating the plurality of sub-words to the machine translation encoder used for machine translation; and
determining the second feature vector to be an output from the machine translation encoder for the sequentially input input vectors.

9. The method of claim 1, further comprising:
storing the first feature vector, the first language sentence, and the second feature vector in the database; and
storing any one or any combination of the second language sentence and the final second language sentence corresponding to the first feature vector, the first language sentence, and the second feature vector in the database.

10. A non-transitory computer-readable storage medium storing instructions that, when executed by a processor, cause the processor to perform the method of claim 1.

11. The method of claim 1, wherein the controlling of the generating of the candidate sentence list to include the second language sentence and the one or more previous translation final second language sentences is further based the second language sentence.

12. The method of claim 1, wherein the generating of the candidate sentence list includes any one or any combination of:
acquiring a first interpretation result matching a first language feature vector, from the database, determined similar to the first feature vector;
acquiring a second interpretation result matching a second language feature vector, from the database, determined similar to the second feature vector, and
adding any of previous final translation sentences corresponding to any of the first interpretation result and the second interpretation result to the candidate sentence list.

13. The method of claim 1, wherein the generating of the second language sentence includes:
inputting the second feature vector to the machine translation decoder used for machine translation;
generating a predetermined number of sentence sequences based on probabilities of sub-words sequentially output from the machine translation decoder; and
selecting a sentence sequence having a highest score among the predetermined number of sentence sequences to be the second language sentence.

14. An automated interpretation method for translating a sentence from a first language to a second language, the first language and the second language being natural languages, the method comprising:
receiving a voice signal as an input, the voice signal being an input source sentence uttered in the first language;
encoding, using a voice recognition encoder, the voice signal by extracting abstracted voice information from the voice signal to generate a first feature vector using the abstracted voice information, the abstracted voice information being stored in a database;
providing the first feature vector to an input layer of a voice recognition decoder;
decoding, using the voice recognition decoder, the first feature vector to generate a first language sentence in the first language, the first language sentence being stored in the database and corresponding to the abstracted voice information;
encoding, using a machine translation encoder, the first language sentence by extracting abstracted sentence information from the first language sentence to generate a second feature vector with respect to the second language using the abstracted sentence information, the abstracted sentence information being stored in the database and corresponding to the abstracted voice information;
providing the second feature vector to an input layer of a machine translation decoder;
decoding, using the machine translation decoder, the second feature vector to generate a second language sentence in the second language;
generating a candidate sentence list to include the second language sentence and one or more previous translation final second language sentences, being retrieved from the database, based on any one or any combination of the first feature vector, the first language sentence, the second feature vector, and the second language sentence,
wherein the one or more previous translation final second language sentences are previously generated through previous recognition-translation processes performed using the machine translation decoder, and are previously stored in the database,
wherein the one or more previous translation final second language sentences are determined to be similar to the input source sentence based on a comparison of the abstracted sentence information of the input source sentence and abstracted sentence information of plural previous translation final second language sentences previously stored in the database, and
wherein the voice recognition encoder, the voice recognition decoder, the machine translation encoder, and the machine translation decoder are implemented in neural networks being trained; and
selecting, from the candidate sentence list, a final second language sentence as a translation of the input source sentence corresponding to the input voice signal,
wherein the generating of the candidate sentence list includes:
acquiring a first interpretation result matching a first language feature vector, from a database based on a searching of the database with respect to the first feature vector;
acquiring a second interpretation result matching a second language feature vector, from the database based on a searching of the database with respect to the second feature vector; and
acquiring a third interpretation result matching a previous recognized sentence, from the database, determined similar to the first language sentence, and
wherein the generating of the candidate sentence list further includes adding any of previous translation sentences corresponding to any of the first interpretation result, the second interpretation result, and the third interpretation result to the candidate sentence list.

15. A processor-implemented interpretation method for translating a sentence from a first language to a second language, the first language and the second language being natural languages, the method comprising:
receiving a voice signal as an input, the voice signal being an input source sentence uttered in the first language;
encoding, using a voice recognition encoder, the voice signal by extracting abstracted voice information from the voice signal to generate a first feature vector using the abstracted voice information, the abstracted voice information being stored in a database;
providing the first feature vector to an input layer of a voice recognition decoder;
decoding, using the voice recognition decoder, the first feature vector to generate a first language sentence in the first language, the first language sentence being stored in the database and corresponding to the abstracted voice information;
encoding, using a machine translation encoder, the first language sentence by extracting abstracted sentence information from the first language sentence to generate a second feature vector with respect to the second language using the abstracted sentence information, the abstracted sentence information being stored in the database and corresponding to the abstracted voice information;
providing the second feature vector to an input layer of a machine translation decoder;
decoding, using the machine translation decoder, the second feature vector to generate a second language sentence in the second language;
generating a candidate sentence list to include the second language sentence and one or more previous translation final second language sentences, being retrieved from the database, based on any one or any combination of the first feature vector, the first language sentence, and the second feature vector,
wherein the one or more previous translation final second language sentences are previously generated, based on respective previous second feature vectors, through previous recognition-translation processes performed using the machine translation decoder, and are previously stored in the database,
wherein the one or more previous translation final second language sentences are determined to be similar to the input source sentence based on a comparison of the abstracted sentence information of the input source sentence and abstracted sentence information of plural previous translation final second language sentences previously stored in the database, and
wherein the voice recognition encoder, the voice recognition decoder, the machine translation encoder, and the machine translation decoder are implemented in neural networks being trained; and
selecting, from the candidate sentence list, a final second language sentence as a translation of the input source sentence corresponding to the input voice signal,
wherein the generating of the second language sentence includes:
generating a predetermined number of sentence sequences based on probabilities of sub-words sequentially output from the machine translation decoder; and
selecting a sentence sequence having a highest score among the predetermined number of sentence sequences to be the second language sentence,
wherein the generating of the candidate sentence list includes:
acquiring a first interpretation result matching a first language feature vector, from the database, determined similar to the first feature vector;
acquiring a second interpretation result matching a previous recognized sentence, from the database, determined similar to the first language sentence; and
acquiring a third interpretation result matching a second language feature vector, from the database, determined similar to the second feature vector, and
wherein the generating of the candidate sentence list further includes adding any of previous translation sentences corresponding to any of the first interpretation result, the second interpretation result, and the third interpretation result to the candidate sentence list.

16. A processor-implemented interpretation method for translating a sentence from a first language to a second language, the first language and the second language being natural languages, the method comprising:
 encoding, using a machine translation encoder, a first language sentence in the first language as an input source sentence by extracting abstracted sentence information from the first language sentence to generate a feature vector with respect to the second language using the abstracted sentence information, the abstracted sentence information being stored in the database and corresponding to the first language sentence;
 providing the feature vector to an input layer of a machine translation decoder;
 decoding, using the machine translation decoder, the feature vector to generate a second language sentence in the second language;
 generating a candidate sentence list to include the second language sentence and one or more previous translation final second language sentences, being retrieved from the database, based on the feature vector,
 wherein the one or more previous translation final second language sentences are previously generated through previous recognition-translation processes performed using the machine translation decoder, and are previously stored in the database,
 wherein the one or more previous translation final second language sentences are determined to be similar to the input source sentence based on a comparison of the abstracted sentence information of the input source sentence and abstracted sentence information of plural previous translation final second language sentences previously stored in the database, and
 wherein the machine translation encoder and the machine translation decoder are implemented in neural networks being trained; and
 selecting, from the candidate sentence list, a final second language sentence as a translation of the input source sentence,
 wherein the generating of the candidate sentence list includes:
 acquiring a first interpretation result matching a previous recognized sentence, from the database, determined similar to the first language sentence; and
 acquiring a second interpretation result matching a second language feature vector, from the database, determined similar to the feature vector, and
 wherein the generating of the candidate sentence list further includes adding any of previous translation sentences corresponding to any of the first interpretation result and the second interpretation result to the candidate sentence list.

17. The method of claim 16, further comprising:
 encoding a voice signal in the first language to generate a first feature vector; and
 decoding the first feature vector to generate the first language sentence.

18. The method of claim 16, wherein the generating of the candidate sentence list includes
 acquiring a first translation result matching a second language feature vector, from a database, determined similar to the feature vector; and
 adding any of previous translation sentences corresponding to first translation result to the candidate sentence list.

19. The method of claim 16, wherein the selecting of the final second language sentence includes:
 calculating scores of candidate sentences included in the candidate sentence list based on the feature vector; and
 selecting a candidate sentence, from the candidate sentence list, having a highest of the calculated scores to be the final second language sentence.

20. The method of claim 16, wherein the generating of the feature vector includes:
 dividing the first language sentence into a plurality of sub-words;
 sequentially inputting input vectors respectively indicating the plurality of sub-words to an encoder used for machine translation; and
 determining the feature vector to be an output from the encoder for the sequentially input input vectors.

21. The method of claim 16, wherein the generating of the second language sentence includes:
 inputting the feature vector to the machine translation decoder used for machine translation;
 generating a predetermined number of sentence sequences based on probabilities of sub-words sequentially output from the machine translation decoder; and
 selecting a sentence sequence having a highest score among the predetermined number of sentence sequences to be the second language sentence.

22. The method of claim 16, further comprising:
 storing the feature vector in the database, with the first language sentence being stored in the database; and
 storing any one or any combination of the second language sentence and the final second language sentence corresponding to the first language sentence and the feature vector in the database.

23. The method of claim 16, wherein the generating of the candidate sentence list to include the second language sentence and the one or more previous translation final second language sentences is further based the second language sentence.

24. A processor-implemented interpretation method for translating a sentence from a first language to a second language, the first language and the second language being natural languages, the method comprising:
 encoding, using a machine translation encoder, a first language sentence in the first language as an input source sentence by extracting abstracted sentence information from the first language sentence to generate a feature vector with respect to the second language using the abstracted sentence information, the abstracted sentence information being stored in the database and corresponding to the first language sentence;
 providing the feature vector to an input layer of a machine translation decoder;
 decoding, using the machine translation decoder, the feature vector to generate a second language sentence in the second language;
 generating a candidate sentence list to include the second language sentence and one or more previous translation final second language sentences by searching one or more databases using any one or any combination of the feature vector, the first language sentence encoded to generate the feature vector, and the second language sentence,
 wherein the one or more previous translation final second language sentences are previously generated, based on respective previous feature vectors, through previous recognition-translation processes performed using the machine translation decoder, and are previously stored in the database, wherein the one or more previous translation final second language sentences are determined to be similar to the input source sentence based on a comparison of the abstracted sentence information of the input source sentence and abstracted sentence information of plural previous translation final second language sentences previously stored in the database, and wherein the machine translation encoder and the machine translation decoder are implemented in neural networks being trained; and selecting, from the candidate sentence list, a final second language sentence as a translation of the input source sentence, wherein the generating of the candidate sentence list includes:

acquiring a first interpretation result matching a language feature vector, from the database, determined similar to the feature vector; and acquiring a second interpretation result matching a previous recognized sentence, from the database, determined similar to the first language sentence, and wherein the generating of the candidate sentence list further includes adding any of previous translation sentences corresponding to any of the first interpretation result and the second interpretation result to the candidate sentence list.

25. An automated interpretation apparatus for translating a sentence from a first language to a second language, the first language and the second language being natural languages, the apparatus comprising:

a processor configured to receive a voice signal as an input, the voice signal being an input source sentence uttered in the first language a voice recognizer configured to generate a first language sentence by decoding, using a voice recognition decoder, a first feature vector, and configured to generate the first feature vector with respect to the first language by recognition encoding, using a voice recognition encoder, the voice signal, the recognition encoding including extracting abstracted voice information from the voice signal to generate the first feature vector using the abstracted voice information, the abstracted voice information being stored in a database, and the first language sentence being stored in the database and corresponding to the abstracted voice information;

a translator configured to generate a second language sentence in the second language by decoding, using a machine translation decoder, a second feature vector, and configured to generate the second feature vector with respect to the second language by translation encoding, using a machine translation encoder, the first language sentence, the translation encoding including extracting abstracted sentence information from the first language sentence to generate the second feature vector using the abstracted sentence information, and the abstracted sentence information being stored in the database and corresponding to the abstracted voice information, and the decoding of the second feature vector being performed by inputting the second feature vector to an input layer of the machine translation decoder; and the processor configured to select, as a translation of the input source sentence corresponding to the voice signal, a final second language sentence from a candidate sentence list, the candidate sentence list being generated to include the second language sentence and one or more previous translation final second language sentences, being retrieved from the database, based on any one or any combination of the first feature vector, the first language sentence, and the second feature vector, wherein the one or more previous translation final second language sentences are previously generated through previous recognition-translation processes performed using the machine translation decoder, and are previously stored in the database, wherein the one or more previous translation final second language sentences are determined to be similar to the input source sentence based on a comparison of the abstracted sentence information of the input source sentence and abstracted sentence information of plural previous translation final second language sentences previously stored in the database, wherein the voice recognizer encoder, the voice recognition decoder, the machine translation encoder, and the machine translator decoder are implemented in a neural network, wherein the generating of the candidate sentence list includes:

acquiring a first interpretation result matching a first language feature vector, from the database, determined similar to the first feature vector;

acquiring a second interpretation result matching a previous recognized sentence, from the database, determined similar to the first language sentence; and acquiring a third interpretation result matching a second language feature vector, from the database, determined similar to the second feature vector, and wherein the generating of the candidate sentence list further includes adding any of previous translation sentences corresponding to any of the first interpretation result, the second interpretation result, and the third interpretation result to the candidate sentence list.

26. The automated interpretation apparatus of claim 25, wherein the voice recognizer comprises the voice recognition decoder configured to perform the decoding of the first feature vector to generate the first language sentence and the voice recognition encoder configured to perform the recognition encoding of the voice signal to generate the first feature vector, and wherein the translator comprises the machine translation decoder configured to perform the decoding of the second feature vector to generate the second language sentence and the machine translation encoder configured to perform the translation encoding of the first language sentence to generate the second feature vector.

27. The automated interpretation apparatus of claim 26, wherein the processor is further configured to include the voice recognition encoder, the voice recognition decoder, the machine translation encoder, and machine the translation decoder, and wherein the voice recognition encoder implements a neural network, of one or more neural networks of the automated interpretation apparatus, configured to determine the first feature vector based on the voice signal, the voice recognition decoder implements a neural network, of the one or more neural networks of the automated interpretation apparatus, configured to determine the first language sentence based on the first feature vector, the machine translation encoder implements a neural network, of the one or more neural networks of the automated interpretation apparatus, configured to determine the second feature vector based on the first language sentence, and the machine translation decoder implements a neural network, of the one or more neural networks of the automated interpretation apparatus, configured to determine the second language sentence based on the second feature vector.

28. The automated interpretation apparatus of claim 25, further comprising:
a memory comprising the database,
wherein the processor is configured to acquire a candidate sentence determined to correspond to any one or any combination of the first feature vector, the first language sentence, and the second feature vector.

29. The automated interpretation apparatus of claim 28, wherein the processor is configured to retrieve respective elements determined similar to any of the first feature vector, the first language sentence, and the second feature vector from a plurality of elements stored in the database based on one or more approximate nearest neighbor (NN) algorithms.

30. The automated interpretation apparatus of claim 23, wherein the processor is configured to acquire any one or any combination of a first interpretation result matching a first language feature vector, from the database, determined similar to the first feature vector, a second interpretation result matching a previous recognized sentence, from the database, determined similar to the first language sentence, and a third interpretation result matching a second language feature vector, from the database, determined similar to the second feature vector, and
wherein the processor is configured to add any of previous translation sentences corresponding to any of the first interpretation result, the second interpretation result, and the third interpretation result to the candidate sentence list.

31. The automated interpretation apparatus of claim 30, wherein the processor is configured to convert the first language sentence into a vector and determine which of plural previous recognized sentences, from the database, are similar to the first language sentence based on the vector.

32. The automated interpretation apparatus of claim 30, wherein the processor is configured to convert the second language sentence into a vector and determine which of plural previous translation sentences, from the database, are similar to the second language sentence based on the vector and should be included in the candidate list based on the determined similarity.

33. The automated interpretation apparatus of claim 25, wherein the translator is configured to calculate scores of candidate sentences included in the candidate sentence list based on the second feature vector, and
the processor is configured to select a candidate sentence, from the candidate sentence list, having a highest of the calculated scores to be the final second language sentence.

34. The automated interpretation apparatus of claim 25, wherein the processor is configured to sample the voice signal in the first language based on a predetermined frame length, generate respective input vectors corresponding to frames, sequentially input the respective input vectors to the voice recognition encoder used for voice recognition, and determine the first feature vector to be an output from the voice recognition encoder for the sequentially input respective input vectors.

35. The automated interpretation apparatus of claim 23, wherein the processor is configured to input the first feature vector to the voice recognition decoder used for voice recognition, generate a predetermined number of sentence sequences based on probabilities of sub-words sequentially output from the voice recognition decoder, and select a sentence sequence having a highest score among the predetermined number of sentence sequences to be the first language sentence.

36. The automated interpretation apparatus of claim 23, wherein the processor is configured to divide the first language sentence into a plurality of sub-words, sequentially input input vectors respectively indicating the plurality of sub-words to the machine translation encoder used for machine translation, and determine the second feature vector to be an output from the machine translation encoder for the sequentially input vectors.

37. The automated interpretation apparatus of claim 25, wherein the processor is configured to input the second feature vector to the machine translation decoder used for machine translation, generate a predetermined number of sentence sequences based on probabilities of sub-words sequentially output from the machine translation decoder, and select a sentence sequence having a highest score among the predetermined number of sentence sequences to be the second language sentence.

38. The automated interpretation apparatus of claim 23, wherein the processor is configured to store the first feature vector, the first language sentence, and the second feature vector in the database and to store any one or any combination of the second language sentence and the final second language sentence corresponding to the first feature vector, the first language sentence, and the second feature vector in the database.

39. The automated interpretation apparatus of claim 25, wherein the candidate sentence list generated to include the second language sentence and the one or more previous translation final second language sentences is further based on the second language sentence.

40. An automated interpretation system apparatus for translating a sentence from a first language to a second language, the first language and the second language being natural languages, the apparatus comprising:
a processor configured to receive an input source sentence as a first language sentence in the first language;
a translator configured to generate a second language sentence in a second language by decoding, using a machine translation decoder, a feature vector, and configured to generate the feature vector with respect to the second language by translation encoding, using a machine translation encoder, the first language sentence,
the translation encoding including extracting abstracted sentence information from the first language sentence to generate the feature vector using the abstracted sentence information, and the abstracted sentence information being stored in a database and corresponding to the first language sentence, and
the decoding of the feature vector being performed by inputting the feature vector to an input layer of the machine translation decoder; and
the processor configured to select a final second language sentence, as a translation of the input source sentence corresponding to the first language sentence, from a candidate sentence list, the candidate sentence list being generated to include the second language sentence and one or more previous translation final second language sentences, being retrieved from the database, based on the feature vector, wherein the one or more previous translation final second language sentences are previously generated through previous recognition-translation processes performed using the machine translation decoder, and are previously stored in the database, wherein the one or more previous translation final second language sentences are determined to be similar to the input source sentence based on a comparison of the abstracted sentence information of the input source sentence and abstracted sentence information of plural previous translation final second language sentences previously stored in the database, wherein the machine translation encoder and the machine translation are implemented in neural networks being trained, wherein the generating of the candidate sentence list includes:

acquiring a first interpretation result matching a first language feature vector, from the database, determined similar to the first feature vector;

acquiring a second interpretation result matching a previous recognized sentence, from the database, determined similar to the first language sentence; and acquiring a third interpretation result matching a second language feature vector, from the database, determined similar to the second feature vector, and wherein the generating of the candidate sentence list further includes adding any of previous translation sentences corresponding to any of the first interpretation result, the second interpretation result, and the third interpretation result to the candidate sentence list.

41. The automated interpretation system of claim 40, further comprising a voice recognizer configured to generate the first language sentence by decoding a first feature vector generated by recognition encoding a voice signal in the first language.

42. The automated interpretation system of claim 40, further comprising:
a memory comprising the database,
wherein the processor is configured to acquire a first translation result matching a second language feature vector, from the database, determined similar to the feature vector, and add any of previous translation sentences corresponding to the first translation result to the candidate sentence list.

43. The automated interpretation system of claim 40, wherein the translator is configured to calculate scores of candidate sentences included in the candidate sentence list based on the feature vector, and
the processor is configured to select, from the candidate sentence list, a candidate sentence having a highest of the calculated scores to be the final second language sentence.

44. The automated interpretation system of claim 40, wherein the processor is configured to divide the first language sentence into a plurality of sub-words, sequentially input input vectors respectively indicating the plurality of sub-words to the machine translation encoder used for machine translation, and determine the feature vector to be an output from the machine translation encoder for the sequentially input input vectors.

45. The automated interpretation system of claim 40, wherein the processor is configured to input the feature vector to the decoder used for machine translation, generate a predetermined number of sentence sequences based on probabilities of sub-words sequentially output from the machine translation decoder, and select a sentence sequence having a highest score among the predetermined number of sentence sequences to be the second language sentence.

46. The automated interpretation system of claim 40, wherein the processor is configured to store the feature vector in the database, along with the first language sentence stored in the database, and to store any one or any combination of the second language sentence and the final second language sentence corresponding to the first language sentence and the feature vector in the database.

47. The automated interpretation system of claim 40, wherein the candidate sentence list generated to include the second language sentence and the one or more previous translation final second language sentences is further based on the second language sentence.

48. An automated interpretation system comprising:
one or more processors configured to perform voice recognition of an input voice signal, perform a candidate translation of a recognition result of the voice recognition, and compare results of the candidate translation and previous corresponding results for select previous final sentence translation results to determine a final sentence translation result of the input voice signal, wherein the comparison includes comparing information for one or more of information derived in the voice recognition and information derived in the candidate translation respectively with information stored in a database for plural previous final sentence translation results to identify the select previous final sentence translation results, wherein the plural previous final sentence translation results have been previously generated, through previous recognition-translation processes performed using a machine translation decoder, and are previously stored in the database, wherein the plural previous translation final sentence translation results are determined to be similar to the input source sentence based on a comparison of abstracted sentence information of the input source sentence and abstracted sentence information of plural previous translation final sentence translation results previously stored in the database, and wherein the machine translation decoder is implemented in neural networks being trained, wherein the information stored in the database for the plural previous final sentence translation results include corresponding information derived during a previous voice recognition and corresponding information of previous candidate translations, with the information of the previous candidate translations being distinguished from the select previous final sentence translation results, wherein the plural previous final sentence translation results are generated by:

acquiring a first interpretation result matching a first language feature vector, from the database, determined similar to a first feature vector;

acquiring a second interpretation result matching a previous recognized sentence, from the database, determined similar to a first language sentence;

acquiring a third interpretation result matching a second language feature vector, from the database, determined similar to a second feature vector; and adding any of previous translation sentences corresponding to any of the first interpretation result, the second interpretation result, and the third interpretation result to the plural previous final sentence translation results.

49. The automated interpretation system of claim 48, wherein the comparison includes comparing information for one or more of the first feature vector derived in the voice recognition, the first language sentence derived in the voice recognition, the second feature vector derived in the candidate translation, and a candidate second language sentence derived in the candidate translation with the information stored in the database to identify the select previous final sentence translation results.

50. The automated interpretation system of claim 48, wherein the one or more processors are comprised in a same mobile device.

51. The automated interpretation system of claim 49, wherein the identifying of the select previous final sentence translation results includes determining respective similarities, based on one or more approximate nearest neighbor (NN) algorithms, between any of the first feature vector, the first language sentence, the second feature vector, and the candidate second language sentence, and plural previous first feature vectors, plural previous first language sentences, plural previous second feature vectors, and plural previous candidate second language sentences stored in the database.

* * * * *